United States Patent [19]
Yoshida et al.

[11] Patent Number: 5,671,336
[45] Date of Patent: Sep. 23, 1997

[54] APPARATUS BASED ON N-VARIABLE UNLIMITED RECURRENT ADJUSTABLE NETWORK

[75] Inventors: Kazumi Yoshida; Norimasa Kishi, both of Yokohama, Japan

[73] Assignee: Nissan Motor Co., Ltd., Yokohama, Japan

[21] Appl. No.: 305,947

[22] Filed: Sep. 15, 1994

[30] Foreign Application Priority Data

Sep. 16, 1993 [JP] Japan .................................. 5-230195

[51] Int. Cl.⁶ .................... G06E 1/00; G06E 3/00; G06F 15/18
[52] U.S. Cl. .................... 395/24; 395/21; 395/27
[58] Field of Search .................... 382/155–159; 364/724.01, 424.05; 395/20–25, 27

[56] References Cited

U.S. PATENT DOCUMENTS

| | | | |
|---|---|---|---|
| 5,371,834 | 12/1994 | Tawel | 395/23 |
| 5,408,424 | 4/1995 | Lo | 364/724.01 |
| 5,412,754 | 5/1995 | Le Cun et al. | 395/24 |

FOREIGN PATENT DOCUMENTS

| | | | |
|---|---|---|---|
| 4-149663 | 5/1992 | Japan | G06F 15/18 |
| 4-149661 | 5/1992 | Japan | G06F 15/18 |

OTHER PUBLICATIONS

Yoshida et al, "On the architecture of a recurrent neural network as a chaos 1/f generator"; Proceedings of hte 1995 IEEE Internatonal Conference on Fuzzy Systems. The International joint conference of the fourth IEEE international conference on fuzzy sy Mar. 1995.

Hakim et al, "Volterra characterization of neural networks"; Conference record of the twenty–fifth Asilomar conference on signals, systems and computers, pp. 1128–1132 vol. 2, 4–6 Nov. 1991. Nov. 1991.

Youlal et al, "Fast diagonal recurrent neural networks for identification and control of non–linear systems"; International conference on control 94', pp. 104–109 vol. 1, 21–24 Mar. 1994.

(List continued on next page.)

*Primary Examiner*—Tariq R. Hafiz
*Attorney, Agent, or Firm*—Lowe, Price, LeBlanc & Becker

[57] ABSTRACT

An apparatus based on an n-variable unlimited recurrent adjustable network (URAN$_n$) comprises: two layers, each layer having the same number (n) of neuron elements; linear neuron elements $x_i$ constituting a first layer; nonlinear artificial neuron elements $y_j$ having respective temperature-dependent parameters Tj and constituting a second layer. Each linear and nonlinear neuron element of the first and second layers is connected using a feedforward connection part, a recurrent connection part, and an auto connection part. A nonlinear oscillation apparatus having the recurrent neural network is generally operated in accordance with the equation (1) described below:

$$\tau_1 \frac{dx_1}{dt} = -x_1 + \mu_1 x_1 + \lambda_1 f\left( \frac{w_{11}x_1 + w_{12}x_2 + \ldots + w_{1n}x_n}{T_1} \right)$$

$$\equiv g_1(x_1, x_2, \ldots x_n)$$

$$\vdots$$

$$\tau_i \frac{dx_i}{dt} = -x_i + \mu_i x_i + \lambda_i f\left( \frac{w_{i1}x_1 + w_{i2}x_2 + \ldots + w_{in}x_n}{T_i} \right)$$

$$\equiv g_i(x_1, x_2, \ldots x_n)$$

$$\vdots$$

$$\tau_n \frac{dx_n}{dt} = -x_n + \mu_n x_n + \lambda_n f\left( \frac{w_{n1}x_1 + w_{n2}x_2 + \ldots + w_{nn}x_n}{T_n} \right)$$

$$\equiv g_n(x_1, x_2, \ldots x_n).$$

26 Claims, 14 Drawing Sheets

OTHER PUBLICATIONS deFigueiredo, "A neural network model for nonlinear predictive coding in Fock space"; 1993 IEEE International symposium on circuits and systems, pp. 2164–2167 vol. 4, 3–6 May 93.

"An Introduction to Neurocomputing", edited by Kaoru Nakano, p. 143, published by Corona Publishing, Apr. 5, 1990.

"The New IEEE Standard Dictionary of Electrical and Electronics Terms", 5th edition, p. 716, 1992.

"On the Recurrent Neural Networks", Kenu–ichi Funahashi, Toyohashi University of Technology, The Institute of Electronics, Information and Communication Engineers, 1992.

"Chaos In Neural System", Chapter 7, 1993, pp. 245–283.

"STRANGE ATTRACTOR"

APPARATUS BASED ON N-VARIABLE UNLIMITED RECURRENT ADJUSTABLE NETWORK

BACKGROUND OF THE INVENTION

1. Field of the Invention

The present invention relates generally to an apparatus based on a recurrent neural network (hereinafter, abbreviated as an RNN) and, more particularly, relates to the apparatus based on the RNN which carries out a generation of a nonlinear oscillation and/or its processing such as a nonlinear oscillation identification. The RNN in this specification is called URAN$_n$ which will be described later.

The RNN is, generally, applicable to an information processing in a nonlinear system.

For example, when the RNN facilitates a design of circuit constants of a circuitry when a nonlinear oscillator is mounted in an electric or electronic circuit.

In addition, since the RNN (n-variable Unlimited Recurrent Adjustable Network; hereinafter, abbreviated as an URAN$_n$ according to the present invention is capable of processing nonlinearly a time series (sequence) signal, URAN$_n$ can effectively be utilized for a nonlinear filter and for a smooth control of an engineering system having remarkable nonlinearity characteristics such as a robot to which the nonlinear filter 1s applied.

Fluctuations (so called, 1/f fluctuations) involved in a chaotic temporal signal generated from the URAN$_n$ can be used to provide waveform fluctuations and pitch fluctuations near to natural sounds for a sound source and rhythm source of such a composition and/or performing system of a computer music, a speech synthesis system, or voice converting system. Similarly, the temporal signal having such fluctuations as described above is applicable to control purposes of a vehicle or a building interior/exterior equipment such as an air conditioning system, lighting system, and body sonic sheet so as to contribute to an improvement of comfort in residential environments.

Furthermore, the temporal signal having such fluctuations as described above is again encoded in a spatial pattern so as to be permitted to assist in discussions on designs of an interior and exterior of the vehicle or the building and on the improvement in comfort of a light up pattern.

The temporal signal having the fluctuations and the spatial pattern having the fluctuations can effectively be utilized to enhance a stage effect on a dramatic performance (theatrical performance), concert, and so forth on a stage or, so-called, a live house.

2. Description of Background Art

FIG. 1 exemplifies a previously proposed nonlinear oscillation generating apparatus using URAN$_n$.

A structure described in FIG. 1 is called an excitatory, inhibitory two-cellular circuit model and is a nonlinear oscillation generating system constituted by a two-element artificial neurons (also called formal neurons or, simply, neurons, but hereinafter referred to the artificial neurons or artificial neuron elements) described, for example, in a Japanese Publication Book titled "An introduction to Neurocomputing" edited by Kauoru Nakano, page 143, published by Corona Publishing Co., Ltd. on Apr. 5, 1990 and in a IEEE's paper, Amari, S. (1992). Characteristics of random nets of analog neuron-like elements. IEEE Transactions on Systems, Mam and Cybernetics, SMC-2, 643–657.

Suppose that, in FIG. 1, average membrane potential of the artificial neurons $x_1$ and $x_2$ are denoted by $u_1$ and $u_2$, respectively. Here, a dynamical system can be described in equation of motion defined in equation (14) as a nonlinear function f having saturation characteristics.

$$\tau_1 \frac{du_1}{dt} = -u_1 + \mu_1 f(u_1) + w_{12} f(u_2) \quad (14)$$

$$\tau_2 \frac{du_2}{dt} = -u_2 + \mu_2 f(u_2) + w_{21} f(u_1),$$

wherein $\tau_1$ and $\tau_2$ denote time constants of the artificial neurons $x_1$ and $x_2$, respectively, $\mu_1$ and $\mu_2$ denote auto connection coefficients of the artificial neurons $x_1$ and $x_2$, respectively, $w_{12}$ and $w_{21}$ denote cross connection coefficients (in a case where the connections are inhibitory connections, these $w_{ji}$ indicate negative values), and the above-described nonlinear function f is for example, $f(x) \equiv \tanh(x)$.

On the other hand, an APOLONN model reported by Masaaki Sato of ATR (Kabushiki Kaisha A.T.R, human information communication research institute) for learning a vocal fluctuation exemplifies another previously proposed neural network having a two-layer recurrent structure in which the excitatory, inhibitory two-cellular circuit models are connected in parallel to each other. The APOLONN model is, for example, described in pages 245 through 283, Chapter 7, "Learning of chaos dynamics in Recurrent Neural Network" of a Japanese Publication Book titled "Chaos in Neural System" edited by Kazuyuki Aihara and published by Tokyo Denki Daigaku Syuppan Kyoku in 1993 or one of international convention manuscripts of [Masa-aki SATO, Kazuki Joe, Tatsuya HIRAHARA: APOLONN brings us to the real world: Learning nonlinear dynamics and fluctuations in nature", Proceedings of International Joint Conference on Neural Networks (IJCNN) 90 at San Diego, Vol. 1, pp. I581–I-587, 1990].

FIG. 2 shows a structure of the APOLONN model.

In FIG. 2, a part 10 enclosed by a broken line corresponds to the circuit model shown in FIG. 1. A part enclosed by a black disk corresponds to an output unit of the APOLONN model. White circles denoted by reference numerals 12 are paired with longitudinally aligned white circles 12 so as to constitute single units.

SUMMARY OF THE INVENTION

It is therefore a principal object of the present invention to provide URAN$_n$ having a large degree of freedom in setting parameters, which is capable of generating and/or processing a nonlinear oscillation having a universal waveform and frequency, explicitly indicating a method of determining internal parameters thereof as formulae, and is capable of easily achieving the nonlinear oscillation having target or desired physical characteristics with less number of times trials are carried out.

The above-described object can be achieved by providing a recurrent neural network system having a two-layer hierarchical structure and a recurrent connection, each layer of said recurrent neural network including the same number of neuron elements, said recurrent neural network comprising: a) a first layer constituted by linear artificial neurons $x_i$ (i=1, 2, - - - , f, - - - n); b) a second layer constituted by nonlinear artificial neurons $y_j$ (j=1, 2, - - - , j, - - - , n) and which are constructed so as to convert input signals thereto into output signals by means of given same nonlinear functions f, their temperature parameters being denoted by $T_j$; c) a feedforward connection part which is so constructed as to multiply outputs of the first layer artificial neuron $x_i$ by feedforward connection coefficients $w_{ji}$ and so as to input each of the multiplied outputs to a corresponding one of all of the artificial neurons $y_j$ of said second layer; d) a recurrent connection part which is constructed so as to multiply outputs of the respective artificial neurons $y_j$ of said second layer by recurrent connection $\lambda_j$, so as to provide first-order delays of time constants $\tau_j$ for the multiplied outputs of the respective artificial neurons $y_j$, and so as to input a corresponding one of the artificial neurons $x_j$ of said first layer; and e) an auto connection part which is so constructed as to multiply the outputs of the respective artificial neurons $x_i$ of the first layer, so as to provide the first-order delays of the time constants $\tau_i$ for the multiplied outputs from said auto connecting part, and so as to input again each of the first-order time delayed outputs to the corresponding one of said artificial neurons $x_i$, and wherein said recurrent neural network operates in accordance with the following equation (1) and generates a nonlinear oscillation, $$\tau_1 \frac{dx_1}{dt} = -x_1 + \mu_1 x_1 + \lambda_1 f\left( \frac{w_{11}x_1 + w_{12}x_2 + \ldots + w_{1n}x_n}{T_1} \right) \quad (1)$$

$$\equiv g_1(x_1, x_2, \ldots x_n)$$

$$\vdots$$

$$\tau_i \frac{dx_i}{dt} = -x_i + \mu_i x_1 + \lambda_i f\left( \frac{w_{i1}x_1 + w_{i2}x_2 + \ldots + w_{in}x_n}{T_i} \right)$$

$$\equiv g_i(x_1, x_2, \ldots x_n)$$

$$\vdots$$

$$\tau_n \frac{dx_n}{dt} = -x_n + \mu_n x_n + \lambda_n f\left( \frac{w_{n1}x_1 + w_{n2}x_2 + \ldots + w_{nn}x_n}{T_n} \right)$$

$$\equiv g_n(x_1, x_2, \ldots x_n),$$

wherein f denotes the given nonlinear output function having saturation characteristics, and g denotes a characteristic function to discuss a stability of a differential equation system and an equilibrium state (or a stationary solution) when g=0.

The above-described object can also be achieved by providing an apparatus based on an n-variable unlimited recurrent adjustable network, comprising: a) at least hierarchically structured two layers, each layer having the same number (n) of neuron elements; b) a plurality of linear artificial neuron elements $x_i$ (i=1, 2, - - -, i, - - -, n) constituting a first layer of the two layers; c) a plurality of nonlinear artificial neuron elements $y_j$ (j=1, 2, - - -, j, - - -, n) having respective temperature-dependent parameters Tj and constituting a second layer of the two layers, each nonlinear artificial neuron element $y_j$ converting an input signal thereto into an output signal using a predetermined nonlinear function f; d) a feedforward connection part which is so constructed as to multiply each output signal derived from each one of the linear artificial neuron elements $(x_i)$ of the first layer by a feedforward connection coefficient $w_{ji}$ and to provide each of the multiplied output signals ($w_{11}$, $w_{12}$, - - - $w_{1j}$, - - - , $w_{1n}$, $w_{21}$, $w_{22}$, - - - , $w_{2i}$, - - - , $w_{2n}$, - - - , $w_{n1}$, $w_{n2}$, - - - , $w_{nj}$, - - - , $w_{nn}$) for all of the nonlinear artificial neuron elements $y_j$ of the second layer: e) a recurrent connection part which is so constructed as to multiply each output signal derived from the nonlinear artificial neuron elements $y_j$ of the second layer by a recurrent connection coefficient $\lambda_j$, as to provide a first-order time delay corresponding to a time constant $\tau_j$ for the $\lambda_j$ multiplied output signal, and, thereafter, as to provide the $\tau_j$ delayed and $\lambda_j$ multiplied output signal again to the corresponding one $x_j$ of the linear artificial neuron elements of the first layer; and f) an auto connection part which is so constructed as to multiply the output signal derived from each one $x_j$ of the respective linear artificial neuron elements of the first layer by an auto connection coefficient $\mu_j$, as to provide the first-order delay corresponding to the time constant $\tau_i$ for the $\mu_i$ multiplied signal, and as to provide the $\mu_i$ multiplied, $\mu_i$ delayed signal again for the corresponding one $x_i$ of the respective linear artificial neuron elements.

BEST MODE CARRYING OUT THE INVENTION

Reference will hereinafter be made to the drawings in order to facilitate a better understanding of the present invention.

Figure 1:
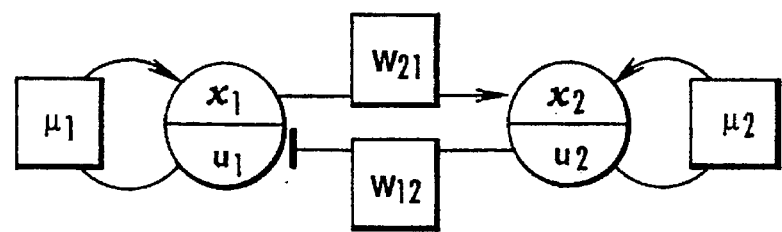
FIG. 1 is a circuit model view of an excitatory and inhibitory two-cellular circuit model described as a two-cellular neuron circuit generally disclosed as a nonlinear oscillation generating system in a Japanese Book titled "an introduction to neurocomputing" edited by Kaoru Nakano, page 143, published as a first publication at Apr. 5, 1990 from CORONA PUBLISHING CO., LTD.
Figure 2:
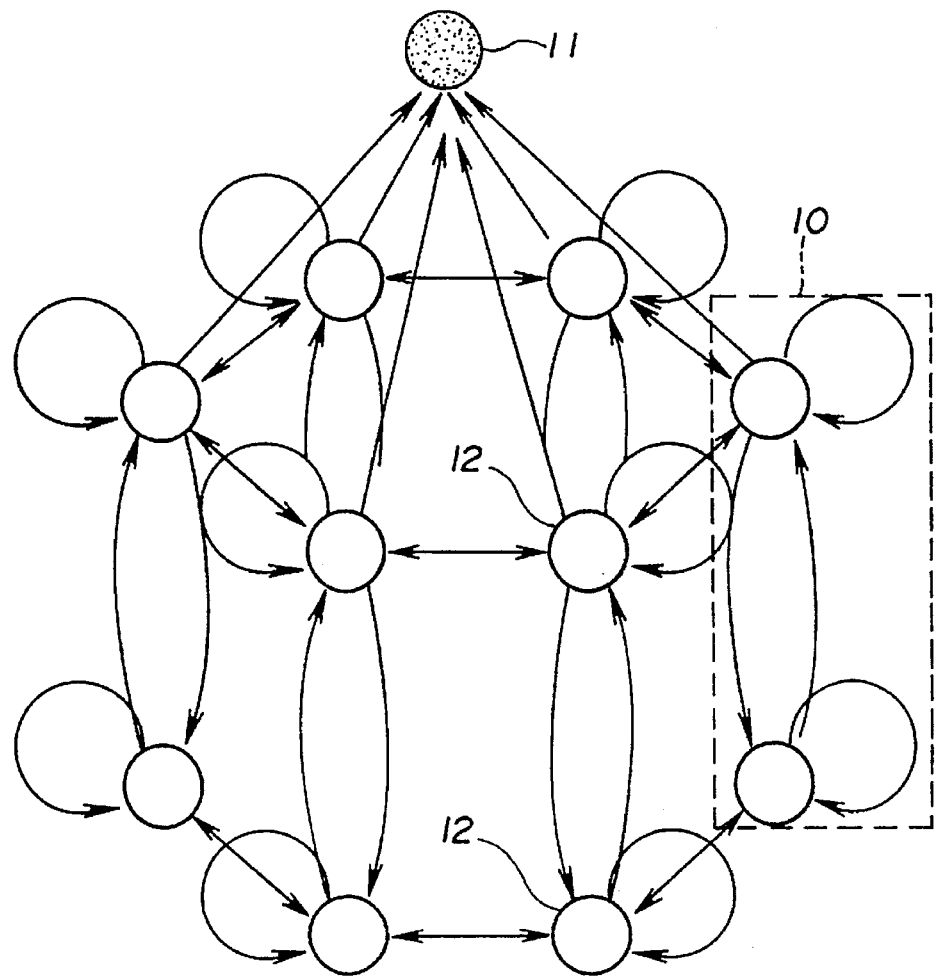
FIG. 2 is a model view of an APOLONN MODEL reported by Masaaki Sato as a previously proposed example of a neural network having a two-layer recurrent network structure in which the excitatory and inhibitory two-cellular circuit models shown in FIG. 1 are connected in parallel to each other.

Before explaining preferred embodiments of $URAN_n$ according to the present invention, the following problems have occurred in the previously proposed nonlinear oscillation generation and/or processing apparatus using the recurrent neural network shown in FIGS. 1 and 2 and described in the BACKGROUND OF THE INVENTION.

(1) since, in the sole excitatory and inhibitory two-cellular neuron circuit model shown in FIG. 1, the number and quantity of the internal parameters are less, a degree of freedom of setting the parameters is small and waveforms and oscillation frequencies of the temporal signals which can be generated by the previously proposed neural network have been limited. Especially, since structures of a feedforward part and a feedback part are not separated from each other, it is impossible to determine connection coefficients of the feedforward part and connection coefficients of the feedback part, independently from each other, respectively, from observations on a geometrical shape of the equilibrium state defined in the above-described equation (14).

(2) Since the internal structures are too complex even in the recurrent neural network having the hierarchical structure, many recurrent neural networks described above cannot derive a method of designing the internal parameters to generate the nonlinear oscillation in the form of formulae. Therefore, the previously proposed recurrent neural networks, for example, shown in FIG. 2, require repetitive learnings for a long time so as to generate a desired nonlinear oscillation.

For example, in a case as shown in FIG. 2 of the APOLONN model proposed by Masaaki Sato et al., it is necessary to use the two-cellular neuron circuits which are combined with 30 of the two-cell neuron circuits connected in parallel to one another in order to succeed the learning although the APOLONN model can be simulated by means of a supervised learning even if the output signal thereof is a chaotic temporal signal. At this time, the connection coefficients having the number up to 1,000 must be optimized by updating 30,000 numbers of times the connection coefficients from a random initial value. Consequently, tremendous amounts of calculations such that a computer would be used and would be operated continuously for about one week would be required even if a parallel processing computer such as Aliant were used.

(3) Kenichi Funahashi of Toyohashi Technology and Science Institute showed that a solution trajectory of a differential equation system considered in the state space $x_1$–$x_2$– ... –$x_i$– ... $x_n$ can approximate an arbitrary spatial curve (chaos, torus, and limit cycle inclusive) and showed that a theorem that a combination of the internal parameters which can achieve the above-described approximation of the arbitrary spatial curve is present. However, this theorem merely indicates the presence of the recurrent neural network and specific derivations of the values of the parameters are not carried out. In addition, the method of deriving the parameter values described above is not described therein any more. Hence, this proposed theorem cannot be applied to an actual engineering technology.

Figure 3:
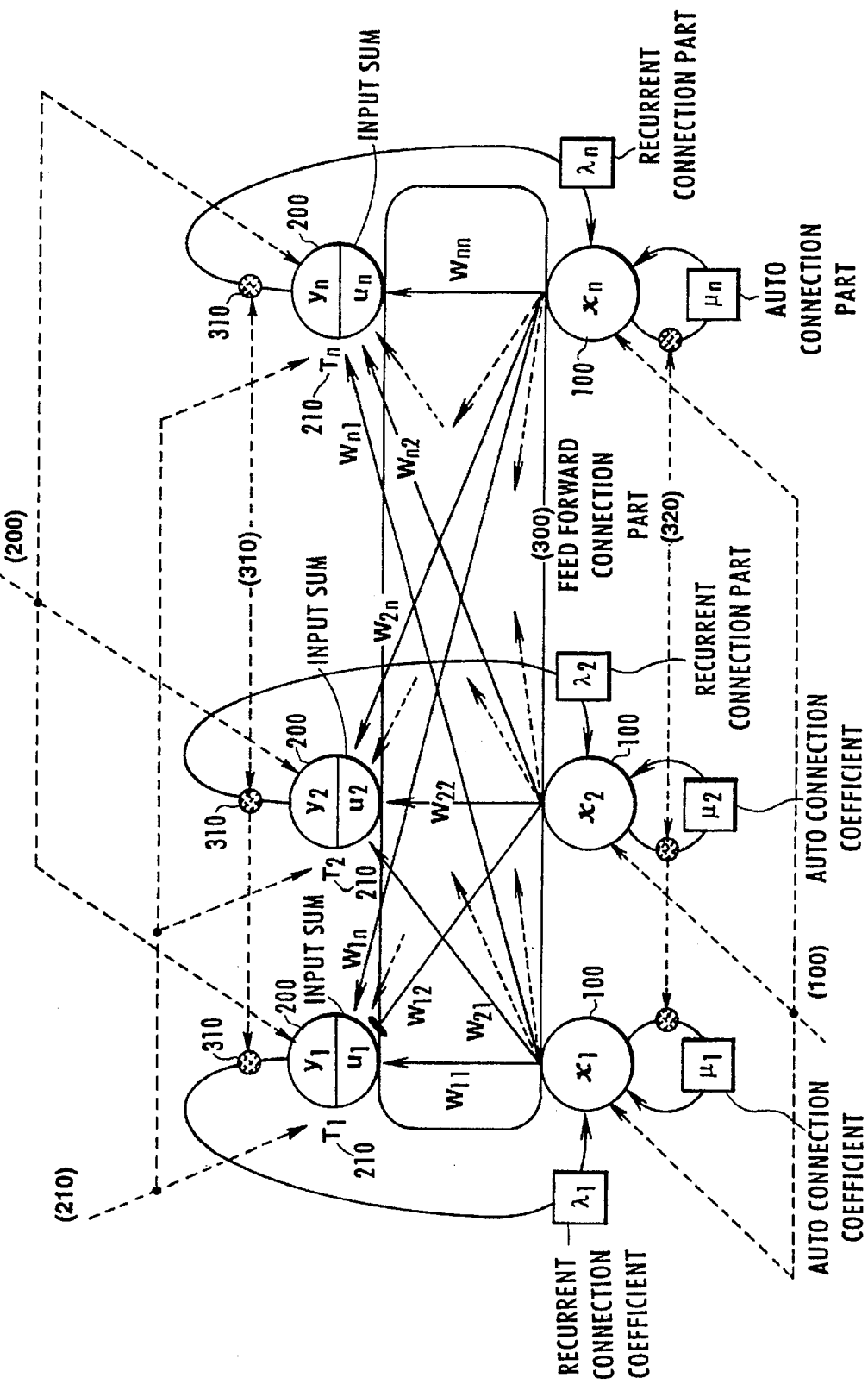
FIG. 3 is a neuron circuit model view of the recurrent neural network ($URAN_n$) ($n \geq 2$) according to the present invention which is capable of generating a nonlinear oscillation in an n-dimensional state space for explaining signal flows of the recurrent neural network ($URAN_n$) according to the present invention.

Referring to FIG. 3, FIG. 3 shows a presented embodiment of a recurrent neural network abbreviated as $URAN_n$ and operated in accordance with an equation (1) representing a differential equation system.

An apparatus shown in FIG. 3 is provided with a two-layer hierarchically structured recurrent neural network ($URAN_n$) having a first layer element group 100 and a second layer element group 200, each element group including neuron circuit elements (so-called, neurons, or artificial neurons) and each layer having the same number (n) of neuron elements.

In addition, the first layer (element group) 100 is constituted by the plural linear artificial neurons $x_i$ (i=1, 2, ..., n). It is noted that the artificial neurons are also called neurons, neuron elements, or formal neurons but hereinafter referred to as artificial neurons or artificial neuron elements. The linear artificial neurons $x_i$ have the same functions to add and/or subtract input signals and to output linearly amplified signals after linear amplifications (input sum of each thereof is $x_i$, an amplification factor of each thereof is 1, and an output of each thereof is $x_i$), respectively. The second layer (element group) 200 is constituted by the plural nonlinear artificial neurons $y_j$. The nonlinear artificial neurons $y_j$ have the same functions to add and/or subtract input signals and to output nonlinearly calculated signals after nonlinear calculations of $y_j=f(u_j)$, (input sum of each thereof is $u_j$ and output of each thereof is $y_j$). It is noted that a reference numeral 210 denotes temperature(-dependent) parameters $T_j$ (j=1, 2, ..., j, ..., n) of the nonlinear artificial neurons $y_j$.

It is desirable to use a highly symmetrical nonlinear function f for the nonlinear output function to convert the input sum $u_j$ of each nonlinear artificial neuron $y_j$ of the second layer (element group) 200 into the output $y_j$. In this embodiment shown in FIG. 3, the output $y_j=f(u_j)=\tanh(u_j)$ is adopted. However, it is, alternatively, possible to make a mathematically equivalent discussion by carrying out a suitable change of variables if a generally known sigmoid function, i.e., $f(u_j)=1/[1+\exp(-u_j)]$ is used.

It is noted that $\tanh(u_j)=\sinh(u_j)/\cosh(u_j)$, $\sinh(u_j)=(e^{u}j-e^{-u}j)/2$, $\cosh(u_j)=(e^{u}j+e^{-u}j)/2$.

Referring to FIG. 3, a feedforward part 300 transmits its input signal from each of the linear artificial neurons $x_i$, which is multiplied by $w_{ji}$ therein, to each one of the nonlinear artificial neurons $y_j$. That is to say, the feedforward part (section) 300 multiplies the respective outputs of the artificial neurons $x_i$ of the first layer 100 by feedforward connection coefficients $w_{ji}$ and, thereafter, outputs the $w_{ji}$ multiplied signals into all artificial neurons of the second layer 200, e.g., for $y_1$, $w_{11}$, $w_{12}$, - - - , $w_{1i}$, - - - , $w_{1n}$ being interconnected from $x_1$, $x_2$, - - - , $x_i$, - - - , $x_n$, for $y_2$, $w_{21}$, $w_{22}$, - - - , $w_{2i}$, - - - , $w_{2n}$ being interconnected from $x_1$ through $x_n$, and for $y_n$, $w_{n1}$, $w_{n2}$, - - - , $w_{ni}$, - - - , $w_{nn}$ being interconnected from $x_1$ through $x_n$.

As appreciated from above, the coefficients $w_{ji}$ denotes feedforward connection coefficients between the first layer 100 and the second layer 200.

Referring to FIG. 3, a recurrent connection part 310 includes excitatory or inhibitory connections and have a first-order time delay (lag).

That is to say, a signal of each artificial neuron $y_j$ of the second layer 200 is multiplied by $\lambda_j$ therein, is provided with the first-order time delay (lag) $\tau_j$, and is fedback to its corresponding one of the artificial neuron $x_j$ placed in the vertical direction with respect to the recurrent connection part 310. The symbol $\lambda_j$ is the recurrent connection coefficient between the corresponding artificial neurons in the first layer 100 and the second layer 200.

Referring to FIG. 3, an auto connection part 320 includes excitatory or inhibitory connections and has the same first-order time delay (lag). That is to say, signals from the respective artificial neurons $x_i$ of the first layer 100 are multiplied by $\mu_i$ and are provided with the first-order time delay (lag) $\tau_i$, and are fedback again to the artificial neurons $x_i$ of the first layer 100. The symbol $\mu_i$ denotes an auto connection coefficient of each artificial neuron $x_i$ of the first layer 100.

Herein, the following equation (1) is given:

$$\tau_1 \frac{dx_1}{dt} = -x_1 + \mu_1 x_1 + \lambda_1 f\left(\frac{w_{11}x_1 + w_{12}x_2 + \ldots + w_{1n}x_n}{T_1}\right) \quad (1)$$

$$\equiv g_1(x_1, x_2, \ldots x_n)$$

$$\vdots$$

$$\tau_i \frac{dx_i}{dt} = -x_i + \mu_i x_i + \lambda_i f\left(\frac{w_{i1}x_1 + w_{i2}x_2 + \ldots + w_{in}x_n}{T_i}\right)$$

$$\equiv g_i(x_1, x_2, \ldots x_n)$$

$$\vdots$$

$$\tau_n \frac{dx_n}{dt} = -x_n + \mu_n x_n + \lambda_n f\left(\frac{w_{n1}x_1 + w_{n2}x_2 + \ldots + w_{nn}x_n}{T_n}\right)$$

$$\equiv g_n(x_1, x_2, \ldots x_n).$$

A time constant $\tau_i$ of the first-order delay (lag) of $URAN_n$ expressed at a left side of the equation (1) is dependent upon a time constant that a device to which $URAN_n$ is applicable inherently (naturally) has, the device being adopted, for example, when $URAN_n$ is actually reduced into practice as a specific system. Therefore, the expression in the equation (1) is disadvantageous in an engineering application thereof to the system. Hence, in the present invention, to solve this problem, a newly expressed dynamical system obtained by a change of variables for the above-described equation (1) namely, the dynamical system expressed in an equation (2) is prepared.

$$\epsilon_1 \frac{dx_1}{dt} = -x_1 + C_1 f\left(\frac{w_{11}x_1 + w_{12}x_2 + \ldots + w_{1n}x_n}{T_1}\right) \quad (2)$$

$$\vdots$$

$$\epsilon_i \frac{dx_i}{dt} = -x_i + C_i f\left(\frac{w_{i1}x_1 + w_{i2}x_2 + \ldots + w_{in}x_n}{T_i}\right)$$

$$\vdots$$

$$\epsilon_n \frac{dx_n}{dt} = -x_n + C_n f\left(\frac{w_{n1}x_1 + w_{n2}x_2 + \ldots + w_{nn}x_n}{T_n}\right).$$

In the equation (2), $2C_i$ can represent a distance between asymptote of equilibrium state denoted by $g_i(x_1, x_2, \ldots, x_n)=0$ within a state space.

In addition, the equation (2) represents a "standard" differential equation system to provide a good prospect of analysis for derivations of parameter determinative formulae as will be described later (in examples which will be described later, n=2 and n=3) and to facilitate their numerical calculus. Although, in the specification, only results of calculations are shown, when deriving the formulae to determine the internal parameters of $URAN_n$, it is more convenient to advance the observations (Considerations) with the state space represented by the equation of (2) (the state space described above is one of phase spaces extended by the outputs of the linear artificial neurons $x_i$ of the first layer 100) as a center of observations (considerations). It is noted that a "small parameter" $\epsilon_i$ which is possible to have an arbitrary value (refer to the equation (2)) can be interpreted as a virtual time constant in the n-dimensional state space: $\{x_1, x_2, \ldots, x_i, \ldots, x_n\}$. The small parameter "$\epsilon_i$" can equally correspond to the time constant $\tau_i$ (having the value in the order corresponding to that inherently provided in the actual device to which $URAN_n$ is applicable) of the equation (1) via the coefficients of the feedback connections (i.e., auto connection coefficient $\mu_i$ of the part 320 and recurrent connection coefficient $\lambda_i$ of the part 310), as appreciated from the formulae (5) and (6) in the case where (n=2) or formulae (9) and (10) in the case where (n=3).

If $$f(x) \equiv \tan h(x) \quad (15)$$

is adopted as a nonlinear saturation type output function, the following relationship (16) is established when a relationship between the geometrical shape of the equilibrium state $g_i(x_1, x_2, \ldots, x_n)=0$ within the state space and connection coefficients in the feedback parts 310 and 320 shown in FIG. 3 is discussed:

$$\lambda_i = C_i(1-\mu_i) \quad (16).$$

The above-described equilibrium state $g_i(x_i, x_2, \ldots, x_n)=0$ has a spatial figure derived from the equation (1) in which the right side thereof=0 and provides an effective tool for qualitatively discussions on the stability of the differential equation system. It is noted that, when n=2, the above-described equilibrium stare's curved surface is turned to be an equilibrium state's curved "line".

The change of variables to associate the small parameter (virtual time constant) $\epsilon_1$ in the state space with the first-order delay time constant $\tau_i$ is given by:

$$\tau_i = (1-\mu_i)\epsilon_i \quad (17).$$

The given simultaneous equations (1) is uniformly transformed into the standard differential equation system (2) by using the combination of the equations (16) and (17).

By solving these equations (16) and (17) for the auto connection coefficients $\mu_i$ and for the recurrent connection coefficients $\lambda_i$, formulae to determine coefficients (auto connection coefficients $\mu_i$ of the part 320 and recurrent connection coefficients $\lambda_i$ of the part 310, shown in FIG. 3) of the feedback connection parts can be derived from the time constant $\tau_i$ in the equation (1) and the small parameter $\epsilon_i$ in the equation (2). These formulae will be described later.

Figure 4:
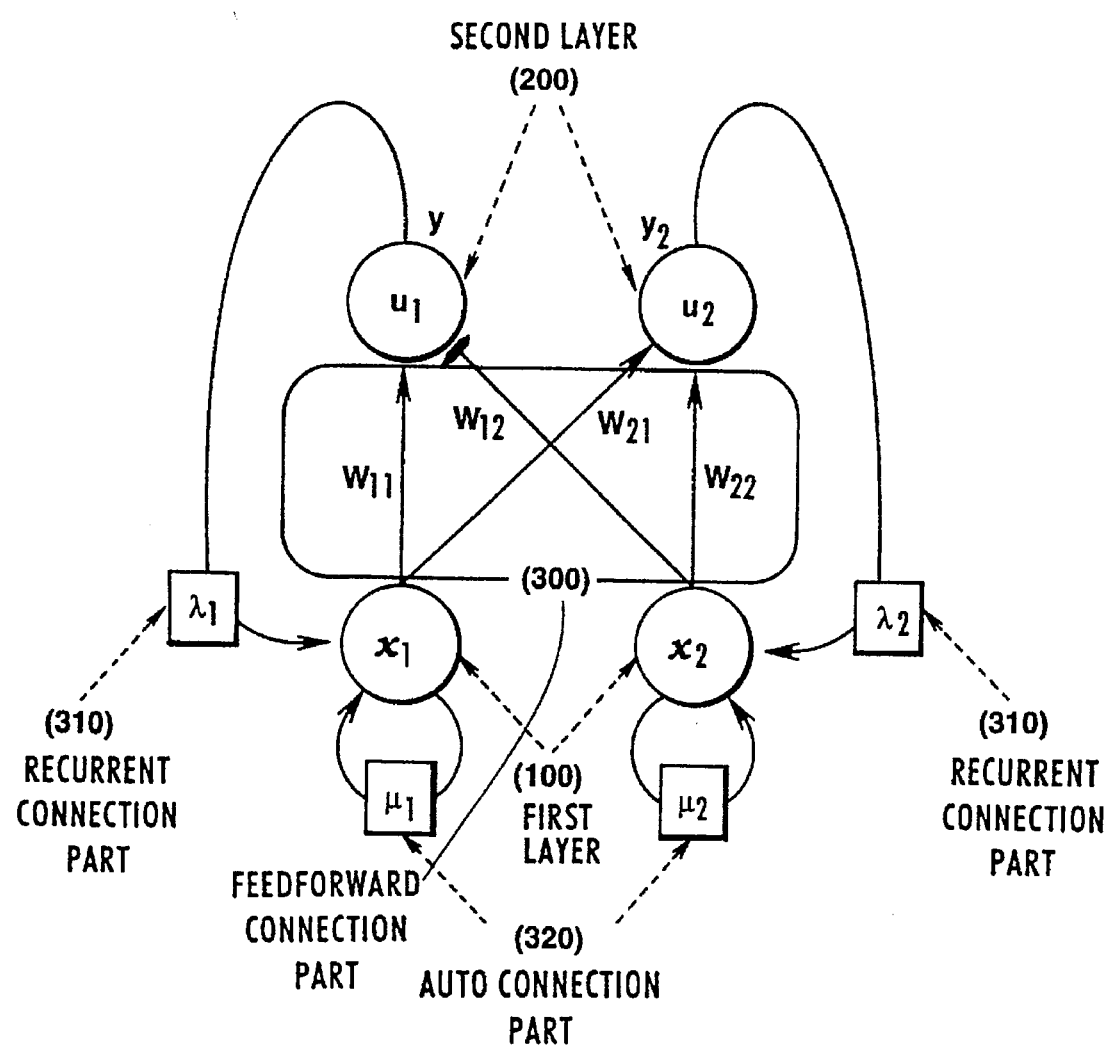
FIG. 4 is a neuron circuit model view of a 2-variable unlimited recurrent adjustable network ($URAN_n$) (n=2) as a specific example of the recurrent neural network ($URAN_n$) according to the present invention.

Next, FIG. 4 shows another preferred embodiment of URAN$_n$, wherein n=2, i.e., URAN$_2$ according to the present invention.

The structure of URAN$_n$ in the case where n=2 (URAN$_2$) will be described below with reference to FIG. 4.

In the case where n=2, the dynamical system representing URAN$_2$ will be described in a 2nd-order nonlinear ordinary differential equation expressed below.

$$\tau_1 \frac{dx_1}{dt} = -x_1 + \mu_1 x_1 + \lambda_1 f\left(\frac{w_{11}x_1 + w_{12}x_2}{T_1}\right) \equiv g_1(x_1, x_2) \quad (18)$$

$$\tau_2 \frac{dx_2}{dt} = -x_2 + \mu_2 x_2 + \lambda_2 f\left(\frac{w_{21}x_1 + w_{22}x_2}{T_2}\right) \equiv g_2(x_1, x_2)$$

$$f(x) \equiv \tanh(x).$$

The above-described URAN$_2$ can easily be realized by means of, for example, an analog (electronic computing) circuit, a digital (electronic) circuit, and/or a microcomputer system.

Figure 5:
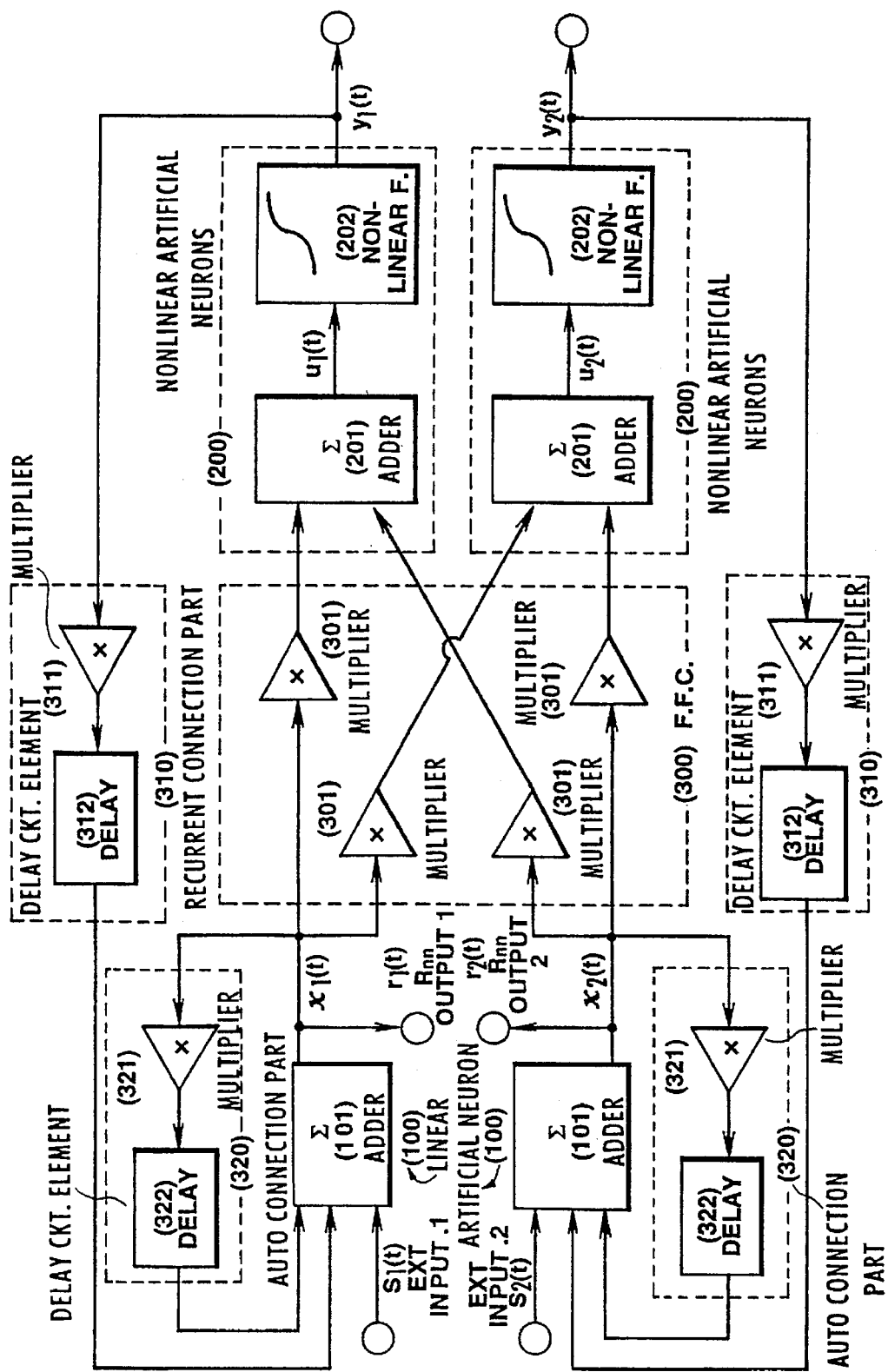
FIG. 5 is a detailed circuit block diagram of the example of $URAN_n$ (n=2) shown in FIG. 4 in which the ($URAN_2$) shown in FIG. 4 is constructed in the form of an analog (neuro)computing circuit.

FIG. 5 shows a circuit block diagram of URAN$_2$ when the structure of URAN$_2$ shown in FIG. 4 is realized by the analog electronic (computing) circuit.

Summers (or adders) Σ101 shown in FIG. 5 constitute the linear artificial neurons $x_i$ of the first layer 100, the summers serving to add and/or subtract input signals thereof, respectively. The feedforward connection parts $w_{ji}$ of the feedforward part 300 connecting the linear artificial neurons $x_i$ of the first layer 100 with the nonlinear artificial neurons $y_j$ of the second layer 200 are constituted by multipliers 301 or alternatively, linear amplifiers (may be constituted by operational amplifiers having gains of 1). The nonlinear artificial neurons $y_j$ of the second layer 200 can be constituted by adders (summers) 201 and nonlinear function generators 202, respectively, as shown in FIG. 5.

Referring to FIG. 5, each recurrent connection part 310 having the corresponding recurrent connection coefficient $\lambda_j$ fedback from the nonlinear artificial neuron $y_j$ of the second layer 200 into the nonlinear artificial neuron $x_j$ of the first layer 100 is constituted by a delay circuit element 312 (for example, a charge coupled device or register) and its series-connected multiplier 311. An auto connection part 320 having the auto connection coefficient $\mu_i$ and which is started from the artificial neuron $x_i$ of the first layer 100 and is fedback again to the same artificial neuron $x_i$ can be constituted by the multiplier 321 and its series-connected delay element 322, as appreciated from FIG. 5.

On the other hand, URAN$_n$, in the case of n=2 can be realized by the microcomputer system, as described above.

That is to say, either the equation (1) or the equation (2) is transformed into time discrete values and the discrete values are transformed into difference equations so that a discrete system program corresponding to FIG. 4 or FIG. 5 can be realized. An equation (38) represents the difference equation in the time discrete system. The microcomputer system includes a CPU (Central Processing Unit), a RAM (Random Access Memory), a ROM (Read Only Memory), a common bus, and I/O interfaces. In this case, for the nonlinear calculation in the nonlinear artificial neuron $y_j$ of the second layer, i.e., $y_j = f(u_j)$, a magnitude of the input $u_j$ is made correspond to an address number using the ROM, a value corresponding to a magnitude of the output $y_j$ being stored into the content of the ROM whose address corresponds to the magnitude of the input $u_j$, so that an arbitrary function can be generated.

The equation (38) will be described below:

$$\tau_1 x_1(t+1) = \mu_1 x_1(t) + \lambda_1 f\left(\frac{w_{11}x_1(t) + w_{12}x_2(t) + \ldots + w_{1n}x_n(t)}{T_1}\right) \quad (38)$$

$$\vdots$$

$$\tau_i x_i(t+1) = \mu_i x_i(t) + \lambda_i f\left(\frac{w_{i1}x_1(t) + w_{i2}x_2(t) + \ldots + w_{in}x_n(t)}{T_i}\right)$$

$$\vdots$$

$$\tau_n x_n(t+1) = \mu_n x_n(t) + \lambda_n f\left(\frac{w_{n1}x_1(t) + w_{n2}x_2(t) + \ldots + w_{nn}x_n(t)}{T_n}\right)$$

$$f(x) = \tanh(x).$$

In addition, in a case where the circuit shown in FIG. 5 is used as a specific nonlinear oscillation generating (oscillating) apparatus, as the ouput of the nonlinear oscillatory signal, $x_1(t)$ and $x_2(t)$ output from the adder 101 (refer to FIG. 5), namely, the output signals of $r_1(t)$ and $r_2(t)$ (Rnn output 1 and Rnn output 2) can be used. Alternatively, $y_1(t)$ and $y_2(t)$ output from the nonlinear artificial neurons $y_1$ and $y_2$ of the part 200 may be used.

Furthermore, $S_1(t)$ and $S_2(t)$ of FIG. 5 (external input 1 and external output 2) serve as input signals when the whole circuit shown in FIG. 5 is used as a nonlinear filter. In this case, when the temporal signals $S_1(t)$ and $S_2(t)$ are input and either the above-described $x_1(t)$ and $x_2(t)$ or the above-described $y_1(t)$ and $y_2(t)$ are output from the circuit shown in FIG. 5, a signal conversion based on the input/output characteristics of URAN$_2$ previously prepared is carried out. Consequently, the whole circuit shown in FIG. 5 operates as the nonlinear filter.

Next, an action of the embodiments of the URAN$_n$ according to the present invention will be described below.

In order to discuss the stability of the equation (1) (namely, the nonlinear ordinary differential equation) representing the dynamical system of the given URAN$_2$, a Jacobian matrix is, herein, defined in the following matrix of (19). The Jacobian matrix is derived by a linearization of the differential equation system in the vicinity of points $(x_1, x_2)$ in the state space defined by the outputs $x_1$–$x_2$ of the linear artificial neuron $x_i$ of the first layer 100.

$$J(x_1, x_2) = \begin{pmatrix} \frac{\partial g_1(x_1, x_2)}{\partial x_1} & \frac{\partial g_1(x_1, x_2)}{\partial x_2} \\ \frac{\partial g_2(x_1, x_2)}{\partial x_1} & \frac{\partial g_2(x_1, x_2)}{\partial x_2} \end{pmatrix}. \quad (19)$$

Here, each component in a left-sided matrix of the Jacobian matrix (19) is given by the following equations (20).

$$\frac{\partial g_1(x_1, x_2)}{\partial x_1} = -1 + \mu_1 + \lambda_1 \frac{w_{11}}{T_1} f'\left(\frac{w_{11}x_1 + w_{12}x_2}{T_1}\right) \quad (20)$$

$$\frac{\partial g_1(x_1, x_2)}{\partial x_2} = \lambda_1 \frac{w_{12}}{T_1} f'\left(\frac{w_{11}x_1 + w_{12}x_2}{T_1}\right)$$

$$\frac{\partial g_2(x_1, x_2)}{\partial x_1} = \lambda_2 \frac{w_{21}}{T_2} f'\left(\frac{w_{21}x_1 + w_{22}x_2}{T_2}\right)$$

-continued
$$\frac{\partial g_2(x_1, x_2)}{\partial x_2} = -1 + \mu_2 + \lambda_2 \frac{w_{21}}{T_2} f\left(\frac{w_{21}x_1 + w_{22}x_2}{T_2}\right).$$

In these embodiments described above, since the highly symmetrical nonlinear function as $f(x) \equiv \tanh(x)$ is adopted as the nonlinear output function f, a case where $(x_1, x_2) \equiv (0, 0)$ can be considered in the equation (19) in order to discuss the stability of an equilibrium point are viewed from such a condition that an unsalability equilibrium point of the dynamical system of $URAN_2$ is coincident with an origin at the state space of $x_1-x_2$. Hence, the following equation (21) can be derived from the above-described equations of (19) and (20).

$$\therefore J(0,0) = \begin{pmatrix} \frac{\partial g_1(0,0)}{\partial x_1} & \frac{\partial g_1(0,0)}{\partial x_2} \\ \frac{\partial g_2(0,0)}{\partial x_1} & \frac{\partial g_2(0,0)}{\partial x_2} \end{pmatrix} \quad (21)$$

$$= \begin{pmatrix} -1 + \mu_1 \lambda_1 \frac{w_{11}}{T_1} & \lambda_1 \frac{w_{12}}{T_1} \\ \lambda_2 \frac{w_{21}}{T_2} & -1 + \mu_2 \lambda_2 \frac{w_{22}}{T_2} \end{pmatrix}.$$

Then, if an eigen value $\psi_\pm$ of J (0, 0) described above is established to be equal to the following equation (22), the eigen value $\psi_\pm$ can be calculated as in the next following equation (23) from the above equation (21).

$$\Psi_\pm = p \pm qi. \quad (22)$$

$$\therefore \Psi_\pm = -1 + \frac{1}{2}\left(\mu_1 + \frac{\lambda_1 w_{11}}{T_1}\right) + \frac{1}{2}\left(\mu_2 + \frac{\lambda_2 w_{22}}{T_2}\right) \pm \frac{1}{2}\sqrt{\left\{\left(\mu_1 + \frac{\lambda_1 w_{11}}{T_1}\right) - \left(\mu_2 + \frac{\lambda_2 w_{22}}{T_2}\right)\right\}^2 + 4\frac{\lambda_1 w_{12}}{T_1} \times \frac{\lambda_1 w_{21}}{T_2}}. \quad (23)$$

Here, the operation of the dynamical system of $URAN_2$ before and after a Hopf bifurcation point is determined as follows depending upon a positive or negative of a real part of the eigen value $\psi_\pm$ of J (0, 0) described above.

That is to say, (1A) in a case where the real part of the eigen value $\psi_\pm$ of the Jacobian matrix (19) is negative ($Re[\psi_\pm]=p<0$), this $URAN_2$ carries out a damped oscillation; and (2A) in a case where the real part of the eigen value $\psi_\pm$ is positive ($Re[\psi_\pm]=p>0$), the $URAN_2$ carries out a self-sustained oscillation (a self-sustained vibration but hereinafter referred to as a self-sustained oscillation).

Hence, in order to force $URAN_n$ to oscillate in the self-sustained oscillation, the internal parameters such as interlayer connection coefficients $w_{ji}$, temperature(-dependent) parameters $T_j$, recurrent connection coefficients $\lambda_i$, and auto connection coefficients $\mu_i$ may be selected so as to satisfy the condition such that $Re[\psi_\pm]>0$.

Figure 6:
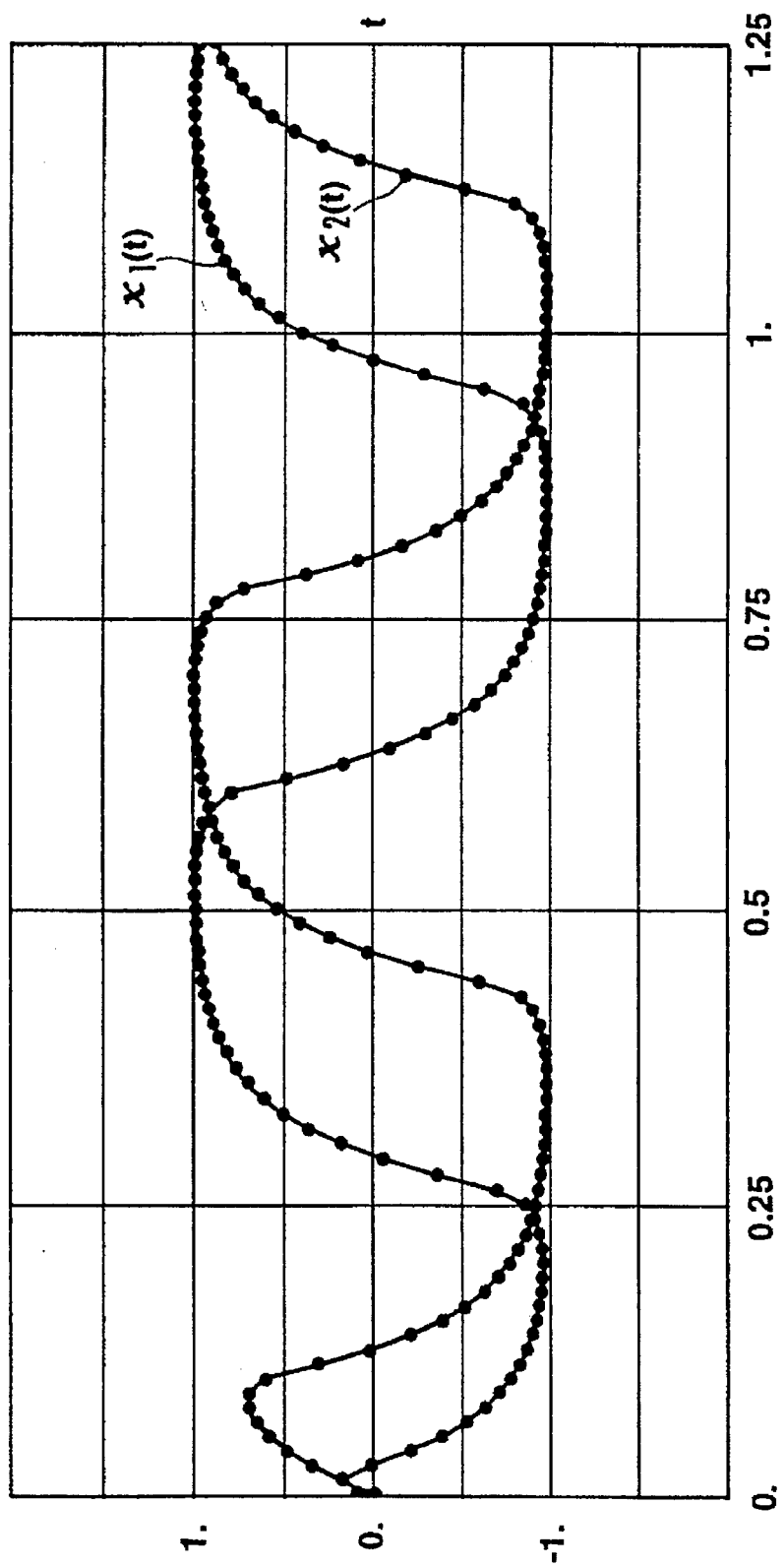
FIG. 6 is a waveform chart of a temporal signal indicating limit cycle oscillations as a time evolution of output potentials of two linear artificial neurons $x_i$ ($x_1$, $x_2$) of the first layer 100 of FIG. 4.

FIG. 6 shows waveform charts of $x_1(t)$ and $x_2(t)$ representing a result of numerical simulation of the nonlinear self-sustained oscillation based on the above-described conclusion.

Characteristic graphs in FIG. 6 are graphs in the space $x_i$-t as the result of numerical simulation in the case where the values of the respective internal parameters are set as those in the following equation (24).

$w_{11}=1.2, w_{12}=-1.0, T_1=0.2, \mu_1=-9.0, \lambda_1=10.0, \tau_1=0.1,$ $w_{21}=1.0, w_{22}=1.2, T_2=0.2, \mu_2=-9.0, \lambda_2=10.0, \tau_2=0.1$ (24).

It is noted that, in a case where each internal parameter is set in the above-described numerical values of the equation (24), $Re[\psi_\pm]=Re[50\pm 50i]=50>0,$ Consequently, the condition of $Re[\psi_\pm]>0$ is satisfied.

As described above, it is appreciated that the $URAN_{n=2}$ according to the present invention functions as the nonlinear oscillator or nonlinear oscillation generating apparatus.

Next, as a method of giving the generating condition for the self-sustained oscillation, a limit cycle in the two-dimensional state space will be exemplified.

The limit cycle is defined as a closed curve in the state space of a particular dynamical system, from which state trajectories may recede, or which they may approach, for all initial states sufficiently close to the curve (refer to page 716 of the New IEEE Standard Dictionary of Electrical and Electronics Terms, Fifth edition).

A geometrical shape in the state space of $x_1-x_2$ of the equilibrium state of the standard-type second-order nonlinear ordinary differential equation shown in the equation (2) is represented by a normal vector $A_i$ on an equilibrium point (herein, it is coincident with the origin of the state space) of the two equilibrium solution states shown in the following equation (25), a distance $C_i$ from the equilibrium point to an asymptotic line of the equilibrium states, and a temperature parameter $T_j$ of the nonlinear artificial neuron $y_j$ of the second layer 200. The equilibrium states described above of the equation (2) is expressed as:

$g_1(x_1, x_2)=0$ $g_2(x_1, x_2)=0$ (25).

Furthermore, using the normal vectors of the equilibrium states shown in the equation (3), the feedforward connection coefficient $w_{ji}$ of the part 300, as shown in the following equation (4), can be determined:

$A_1 = (a_{11}, a_{12})$ (3)
$A_2 = (a_{21}, a_{22}).$ $$w_{11} = \frac{a_{11}}{a_{12}} w_{12} + \frac{T_1}{C_1}, \quad w_{12} = -1, \quad (4)$$

$$w_{21} = 1, \quad w_{22} = \frac{a_{22}}{a_{21}} w_{21} + \frac{T_2}{C_2}.$$

In addition, by arranging the two equations of (16) and (17), a formula (5) which gives the auto connection coefficient $\mu_i$ of the part 320 and a formula (6) which gives the recurrent connection coefficient $\lambda_i$ of the part 310 can be derived.

The equation (16) shows the relationship of $\lambda_i = C_i(1-\mu_i)$ (16)

derived according to the geometrical shape of the equilibrium state within the state space along with the adoption of $f(x) \equiv \tan h(x)$ (15).

The equation (17) shows the change of coefficients to associate the small parameter (virtual time constant)$\epsilon_i$ in the state space with the first-order time delay constant $\tau_i$, of $URAN_2$.

$$\mu_1 = 1 - \frac{\tau_1}{\epsilon_1} \quad (5)$$

$$\mu_2 = 1 - \frac{\tau_2}{\epsilon_2} \ .$$

$$\lambda_1 = C_1 \frac{\tau_1}{\epsilon_1} \quad (6)$$

$$\lambda_2 = C_2 \frac{\tau_2}{\epsilon_2} \ .$$

The second-order nonlinear ordinary differential equation shown in the equation (18) can be transformed into a standard equation (26) (corresponds to the case of n=2 in the equation (2)) described below if the formulae (5) and (6) derived above are used.

$$\epsilon_1 \frac{dx_1}{dt} = -x_1 + C_1 f\left( \frac{w_{11}x_1 + w_{12}x_2}{T_1} \right) \quad (26)$$

$$\epsilon_2 \frac{dx_2}{dt} = -x_2 + C_2 f\left( \frac{w_{21}x_1 + w_{22}x_2}{T_2} \right)$$

$$f(x) \equiv \tanh(x).$$

As compared with the original equation (18), in the above-described equation (26), the numbers of parameters are not only apparently reduced but also the small parameter $\epsilon_i$ within the two-dimensional state space is adopted as the coefficient corresponding to the time constant. Therefore, the small parameter $\epsilon_i$ can be operated independently of $\tau_i$ (having an order of the time constant that the device constituting URAN$_2$ inherently has). Then, the standard differential equation (26) is considered in the two-dimensional state space and the internal parameters of URAN$_2$ are determined in accordance with the limitation condition equations (3) through (6) so as to generate the nonlinear oscillation having the desired physical characteristics consequently, the coefficients of the given differential equation (18) are determined.

As described above, if the defined equation (3) and the derived equations (4), (5), and (6) are deemed to be the formulae, the parameters of the respective parts of URAN$_2$ can be determined on the basis of the deemed formulae (3) through (6).

To generate the self-sustained oscillation (limit cycle), the normal vectors $A_i$ and feedforward connection coefficients $w_{ji}$ may be determined so as to satisfy, for example, the following conditions:

$$w_{12} < 0, \ w_{21} < 0, \ a_{11}a_{12} < 0, \ a_{21}a_{22} > 0 \quad (27).$$

In addition, if the waveform of the generated temporal signal is desired to be the symmetrical, an additive condition such that $$A_1, A_2 0 \quad (28)$$

may be added to the above-described conditions (27).

That is to say, if URAN$_2$ is so designed as to satisfy the above-described equations (3) through (6) which represent the relationships between the internal parameters in URAN$_2$ (in the case where the self-sustained oscillation having the symmetrical waveforms, the conditions (27) and (28) are included), the nonlinear oscillator having the structure of URAN$_2$ can generate the nonlinear temporal signal having a desired physical property. It can be appreciated that this can, in general, determine the stability of the given dynamical system so that the real part of the complex eigen value $\psi_\pm$ of the Jacobian matrix J (0, 0) of the second-order nonlinear ordinary differential equation in the vicinity of the equilibrium point (in this case, the origin in the state space $x_1$–$x_2$) gives a positive and the self-sustained oscillation can be generated from URAN$_2$ in the embodiment when the above-described formulae (3) through (6) are applied to URAN$_2$.

At this time, when the temperature parameter $T_j$ of the part 210 has a value which is positive and sufficiently large, the equilibrium state is slowly bent. When the temperature parameter $T_j$ approaches to zero which is limited value of $T_j$, the bent direction of the equilibrium state becomes steep.

Figure 8:
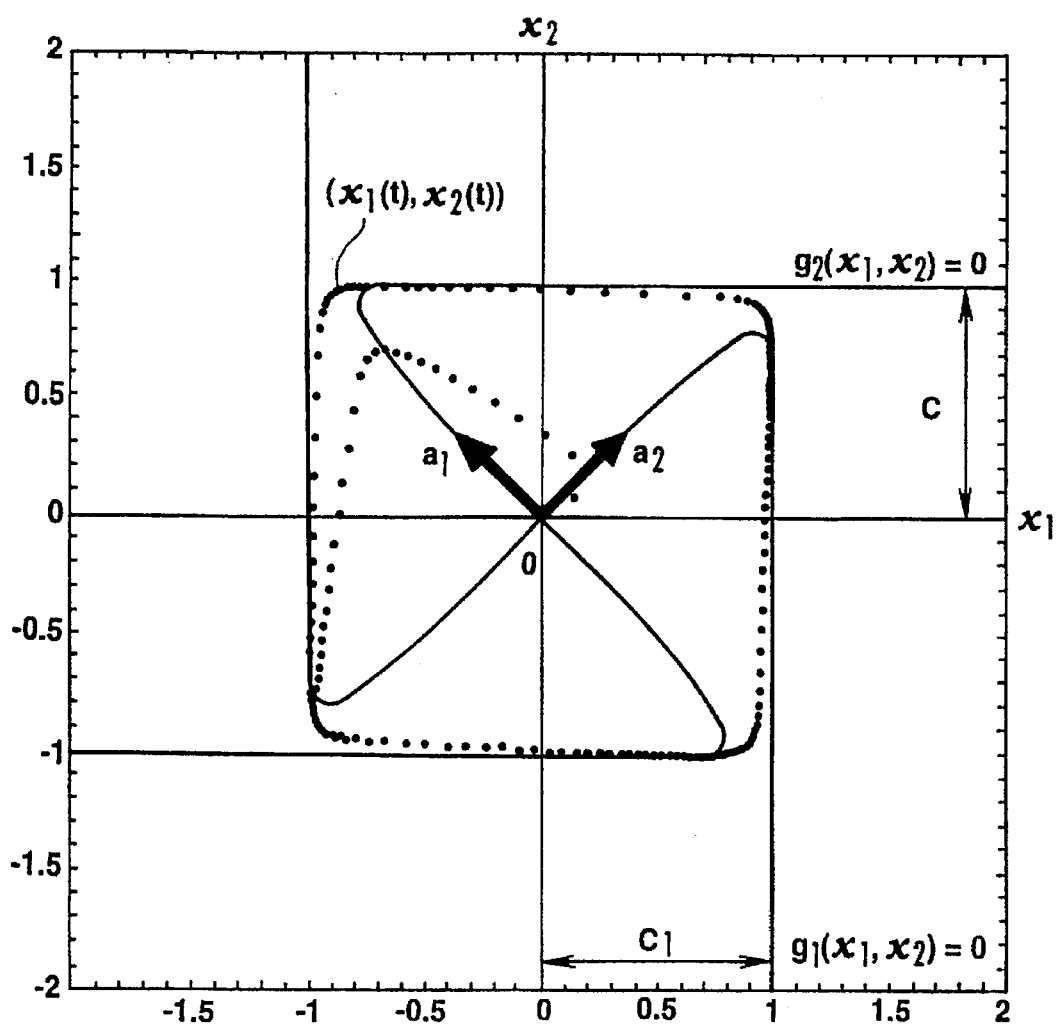
FIG. 8 is a characteristic graph for explaining calculations of parameters of connection coefficients between artificial neuron elements from parameters determining a geometric shape on the equilibrium state of $URAN_2$ and internal parameters of the artificial neurons such as temperature(-dependent) constants.

FIG. 8 shows a characteristic graph representing the above-described relationship. This characteristic is such that the equilibrium state is in accordance with the above-described equation (25) and symbols of $A_i$ and $C_i$ are in accordance with the equations (3), (4), and (6).

Figure 7:
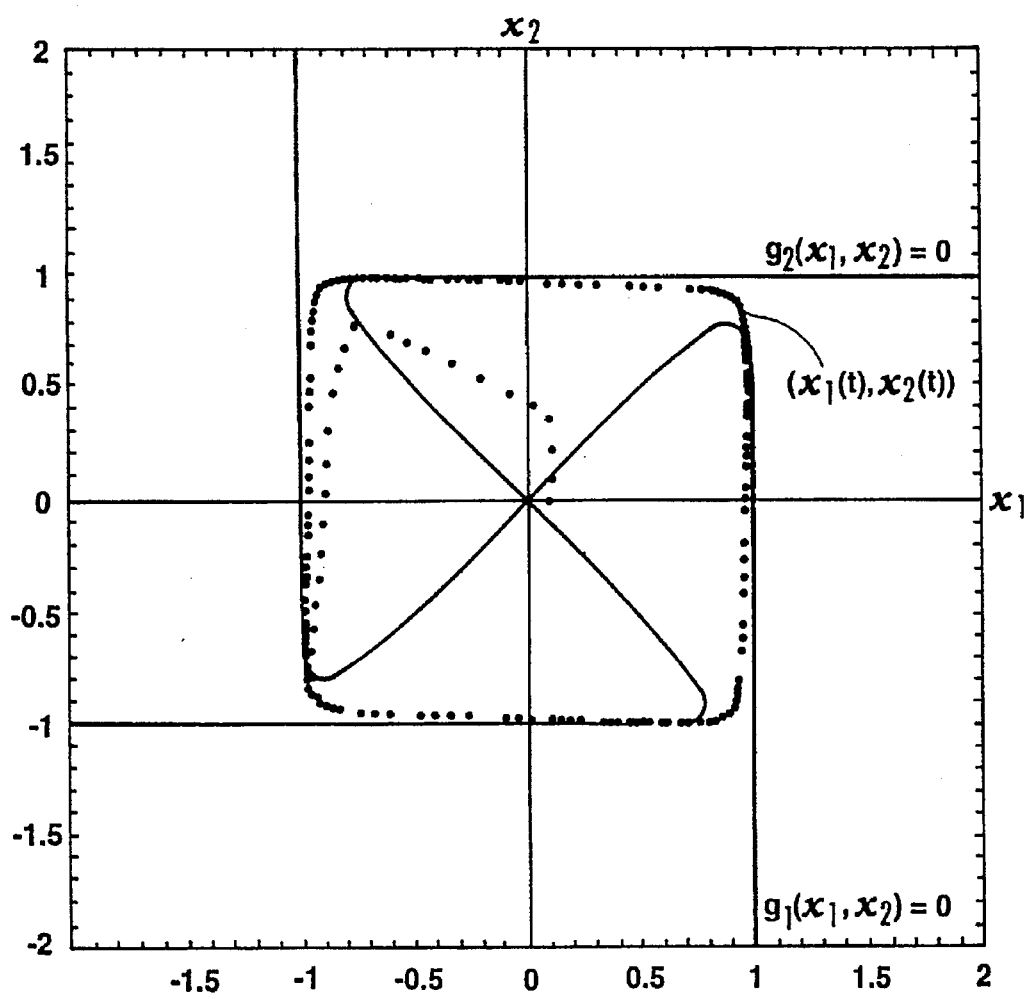
FIG. 7 is a characteristic graph representing characteristics of an equilibrium state of a differential equation system representing a nonlinear oscillator constructed by the $URAN_2$ shown in FIG. 4 so as to generate a nonlinear oscillation.

It is noted that the time evolution solution of the second-order nonlinear differential equation which is derived according to the numerical simulation corresponds to FIGS. 6 and 7.

In FIGS. 7 and 8, although the calculated plotted points are in dotted forms, actually the time evolution solution described above is in the continuous curves for both $x_1(t)$ and $x_2(t)$.

Next, the operation of URAN$_n$ (n=3, URAN$_3$) will be described below.

In a case of either the equation (1) or equation (2), the same consideration as described in the case of URAN$_2$ is given to the URAN$_3$ so that equations (7) through (12) are derived.

That is to say, the normal vectors of the equilibrium states (surfaces) are defined by the following equation (7). The formula to give the feedforward connection coefficients $w_{ji}$ of the part 300 is represented by the following equation (8). The formula to give the auto connection coefficients $\mu_i$ of the part 320 is represented by the following equation (9). The formula to give the recurrent connection coefficients $\lambda_i$ of the part 310 is represented by the following equation (10). (Equations (11) and (12) will be described later).

$$A_1 = (a_{11}, a_{12}, a_{13}) \quad (7)$$
$$A_2 = (a_{21}, a_{22}, a_{23})$$
$$A_3 = (a_{31}, a_{32}, a_{33}).$$

$$w_{11} = \frac{a_{11}}{a_{12}} w_{12} + \frac{T_1}{C_1}, \ w_{12} = -1, \ w_{13} = \frac{a_{13}}{a_{12}} w_{12}, \quad (8)$$

$$w_{21} = 1, \ w_{22} = \frac{a_{22}}{a_{21}} w_{21} + \frac{T_2}{C_2}, \ w_{23} = \frac{a_{23}}{a_{21}} w_{21},$$

$$w_{31} = -1, \ w_{32} = \frac{a_{32}}{a_{31}} w_{31}, \ w_{33} = \frac{a_{22}}{a_{31}} w_{31} + \frac{T_3}{C_3}\ .$$

$$\mu_1 = 1 - \frac{\tau_1}{\epsilon_1} \quad \mu_2 = 1 - \frac{\tau_2}{\epsilon_2} \quad \mu_3 = 1 - \frac{\tau_3}{\epsilon_3}\ . \quad (9)$$

$$\lambda_1 = C_1 \frac{\tau_1}{\epsilon_1} \quad (10)$$

$$\lambda_2 = C_2 \frac{\tau_2}{\epsilon_2}$$

$$\lambda_3 = C_3 \frac{\tau_3}{\epsilon_3}\ .$$

The internal parameters for the respective parts of URAN$_3$ are determined on the basis of the above-described respective formulae (7) through (10).

Here, to generate the self-sustained oscillation, the normal vectors $A_i$ of the equilibrium states shown in the following equation (30) and feedforward connection coefficients $w_{ji}$ may be adjusted within a range which satisfies, for example, $w_{12}<0, a_{11}a_{12}<0, a_{13}a_{12}<0,$ $w_{21}>0, a_{22}a_{21}>0, a_{23}a_{21}>0,$ $w_{31}>0, a_{32}=0, a_{33}a_{31}<0$ (29).

$g_1(x_1, x_2, x_3)=0$ $g_2(x_1, x_2, x_3)=0$ $g_3(x_1, x_2, x_3)=0$ (30).

When the conditions imposed on the normal vectors (refer to the above-described equation (7)) to satisfy the generating condition of the self-sustained oscillation are described by two of the following (I) and (II), the normal vectors with the following conditions of (I) and (II) can be represented by the following equations (11).

$A_1^O=(a_{11}, a_{12}, 0)$ $A_2^O=(a_{21}, a_{22}, 0)$ $A_3^O=(a_{31}, 0, a_{33})$ (11).

"Condition (I): To adopt a singular perturbation form, a constraint surface is formed by the third equilibrium state denoted by $g_3(x_1, x_2, x_3)=0$ (31)

and its normal vector $A_3^O$ is present within a plane of $x_1-x_3$".

"Condition (II): To rotate the vector field about the $x_3$ axis, the normal vectors $A_1^O$ and $A_2^O$ of the first and the second equilibrium states denoted by $g_1(x_1, x_2, x_3)=0$ and $g_2(x_1, x_2, x_3)=0$ (32)

are present in the plane of $x_1-x_2$.

Furthermore, it is necessary for a trajectory of the solution curve in the state space to have a "folding structure" in order to generate a chaotic temporal signal. To achieve this, the normal vectors $A_1^O$ and $A_2^O$ may be changed so that a cross line of the above-described two equilibrium states playing a role of the rotation of a vector field (the cross line described above equals a line of inflection) is not in parallel to the $x_3$ axis, the cross line being defined as $g_1(x_1, x_2, x_3)=g_2(x_1, x_2, x_3)$ (33).

Here, suppose that offset coefficients at a cross point of the cross line with respect to the plane $x_3=C_3$ in directions of $x_1$ and $x_2$ are denoted by $k_1$ and $k_2$, respectively.

The normal vectors after the above-described shift are expressed in the following equations (12).

$$A_1' = \left( a_{11}, a_{12}, -\frac{(k_1C_1a_{11} + k_2C_2a_{12})}{C_3} \right)$$

$$A_2' = \left( a_{21}, a_{22}, -\frac{(k_1C_1a_{21} + k_2C_2a_{22})}{C_3} \right)$$

$A_3' = (a_{31}, 0, a_{33}).$

Hence, fine adjustments of the parameters such as the offset parameters $k_1$ and $k_2$, the temperature parameters $T_j$ of the part 210, and/or small parameters $\epsilon_i$ can cause the $URAN_3$ to generate the chaotic temporal signal having the desired physical property.

When the chaotic temporal signal is generated from $URAN_3$ whose internal parameters are determined using the above-described equations (7) through (12) and the equation (29), various combinations of the parameters can be considered.

In the embodiment of $URAN_3$, the numerical values of these parameters described in the following equations (34) are adopted as one example of the parameters of $URAN_3$.

$w_{11}=-1.1, w_{12}=-1.0, w_{13}=0.085.$ $T_1=1.0, \mu_1=0.0, \lambda_1=1.0, \tau_1=1.0.$ $w_{21}=1.0, w_{32}=1.1, w_{23}=0.1175.$ $T_2=1.0, \mu_2=0.0, \lambda_2=1.0, \tau_2=1.0.$ $w_{31}=-1.0, w_{32}=0.0, w_{33}=0.35.$ $T_3=0.2, \mu_3=-19.0, \lambda_3=20.0, \tau_3=1.0$ (34).

In addition, the equilibrium point is given:

$g_1(x_1, x_2, x_3)=g_2(x_1, x_2, x_3)=g_3(x_1, x_2, x_3)$ (35).

Here, since the eigen value of the differential equation (1) at the equilibrium point of $x_3 \neq 0$ takes a form of:

$(a+b_i, a-b_i, -c)$ (36), when $a>0$, $b>0$, and $c>0$, it can be appreciated that this equilibrium point is an unstability fixed point indicating a one-dimensional stability and a two-dimensional unstability.

Figure 14A:
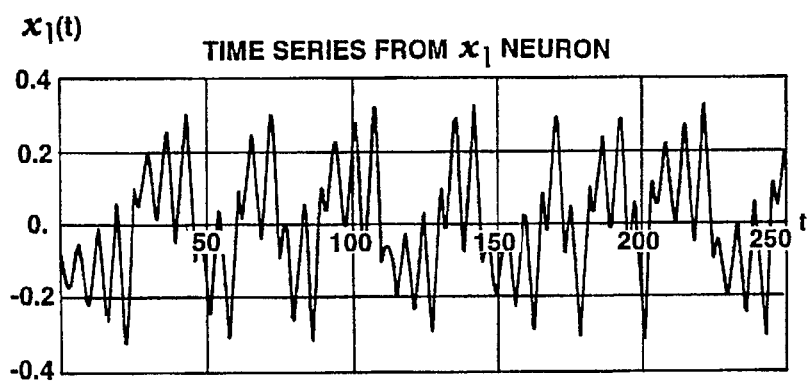
FIGS. 14A, 14B, and 14C are waveform charts representing temporal waveforms in the generated nonlinear self-sustained oscillations in a space of $x_i$–$\tau$ as a result of an actual numerical simulation in equations (7) through (12) and equation (29).
Figure 14B:
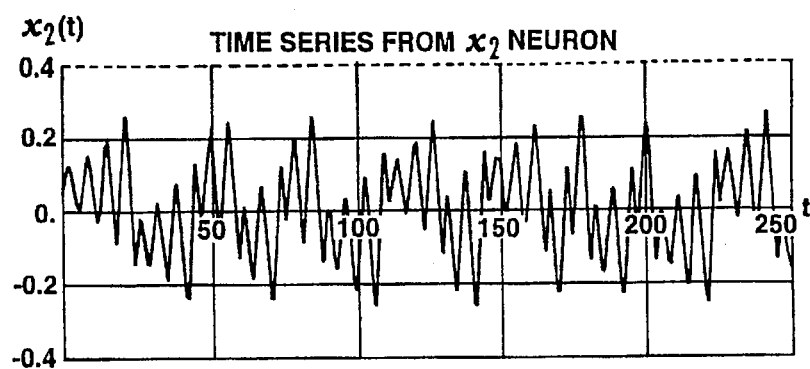
Figure 14C:
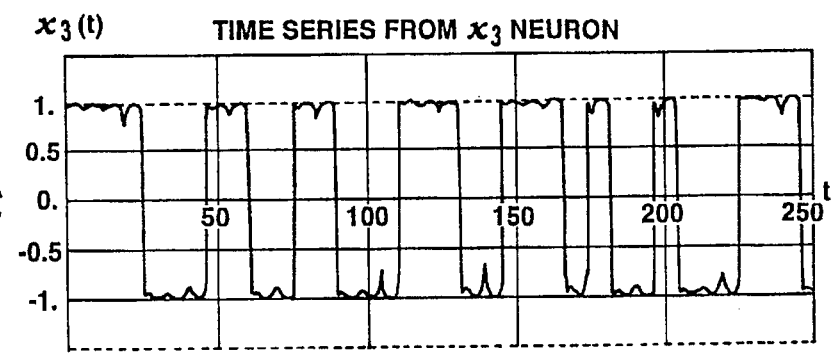

FIGS. 14A through 14C show characteristic graphs of the temporal waveforms of the generated nonlinear self-sustained oscillations in a space of $x_i-t(i=1, 2,$ and 3) as the results of actual numerical simulations in the equations (7) through (12) and the equation (29).

Figure 15:
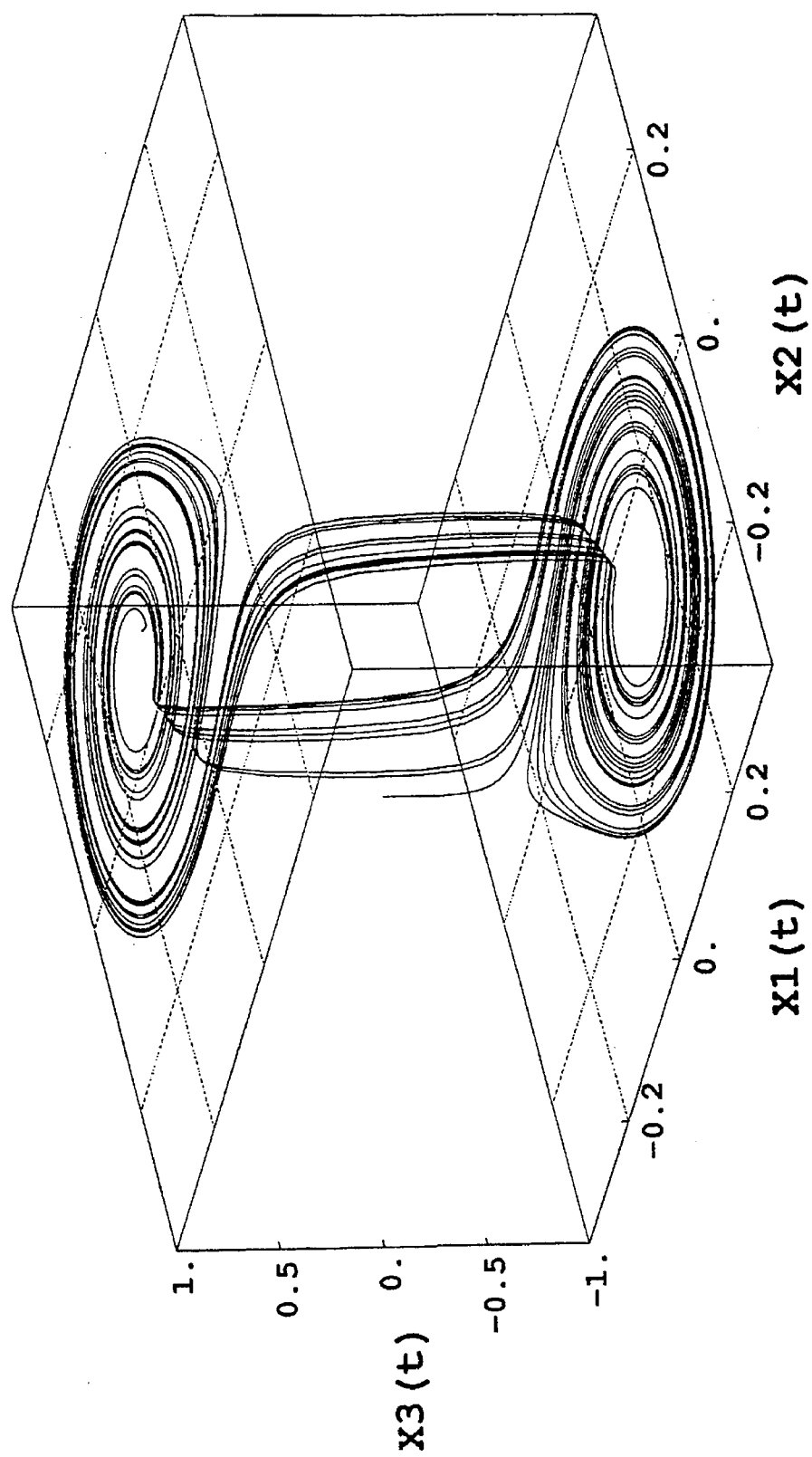
FIG. 15 is a characteristic graph of a "strange attractor" derived and expressed from a chaotic temporal signal having the same chaotic temporal signals as those shown in FIGS. 14A through 14C as a solution trajectory of a three-dimensional state space of $x_1$–$x_2$–$x_3$, each internal parameter being a numerical value shown in equations (34) and defined in an equation (1).

At the times of simulations, the solution curves in the state space $x_1-x_2-x_3$ take a form of an attractor structure in FIG. 15.

It is noted that the characteristic graphs shown in FIGS. 14A through 14C and FIG. 15 are the characteristics when the respective internal parameters indicate the numerical values of the equations (34) which are substituted for the equation (1).

As far as the qualitative appreciation is concerned, since in the attractor shown in FIG. 15, a "folding structure" is observed In the solution trajectory and, in turn, in the temporal waveforms shown in FIGS. 14A through 14C, "intermittent jumps" are observed, the generated temporal signals can be said to considerably be chaotic.

Furthermore, in order to make a quantitative determination for the chaotic characteristics, when Lyapunov (Liapunove or Liapounoff) Exponents are calculated, the following numerical values are established:

$(0.08, 0.00, -16.40)$ (37).

It is, therefore, concluded that the derived attractor shown in FIG. 18 is a "strange attractor". Furthermore, such generated temporal signals as shown in FIGS. 14A through 14C are "chaotic temporal signals".

$URAN_3$ in this embodiment functions as the nonlinear oscillator (of nonlinear oscillation generating apparatus) which is capable of generating a variety of temporal signals including the chaotic temporal signals.

Next, a method of adjusting the first-order time delay constant $\tau_i$ of $URAN_n$ so that the number of times oscillations occur per rime (oscillation frequency) of the generated nonlinear oscillation achieves a target state, in the state space of $x_i$-t represented by output potentials $x_i$ of the linear artificial neurons $x_i$ of the first layer 100 and time axis t, will be described below.

This adjustment operation is executed, for example, for a periodic (not chaotic) nonlinear oscillation waveform in the state space of $x_i$-t as shown in FIG. 8.

That is to say, referring back to FIG. 6, when a sufficient time has passed after the start of the nonlinear oscillation and the oscillation has arrived at a steady state in FIG. 6, suppose that a point at which the nonlinear oscillation waveform derived by observing the output potential of the linear artificial neuron $x_i$ of the first layer 100 of $URAN_n$ first crosses the time axis t is denoted by ($t_0$, 0) and a point at which it crosses after an m period is denoted by ($t_m$, 0).

When the first-order time delay constant of the dynamical system of $URAN_n$ is previously set as $\tau^o$, an arbitrary time constant $\tau^o$ is given according to the following equation (13) so that this $URAN_n$ is caused to generate a trial nonlinear oscillation. Thereafter, the method of adjusting time constant $\tau$ can be provided so that $URAN_n$ executes the self-sustained oscillation at a target oscillation frequency $\omega$.

$$\tau = \frac{2\pi}{\omega} \times \frac{m}{t_m - t_o} \times \tau^o. \tag{13}$$

That is to say, the method of adjusting the time constant to calculate the target time constant $\tau$ is provided according to the equation (13) from the previously set time constant $\tau^0$ so that the generated nonlinear oscillation provides the target oscillation frequency $\omega$ on the basis of an actual measurement of the passed time duration on the time axis from a time at which the oscillation waveform in the state space of $x_i$-t of the output potential of $x_i$ has crossed first the time axis t to a time at which it has crossed again the time axis t after m period.

It is noted that the above-described $\tau$ may be considered to be the first-order time delay constant $\tau_i$ in the equation (1) and to be the small parameter $\epsilon_i$ in the equation (2).

It is also noted that an application range of the equation (13) excludes a chaotic region as apparently from a standpoint of the physical property of the nonlinear dynamical system.

As described above, the cases of n=2 and n=3 have been explained for $URAN_n$.

In general, $URAN_n$ having each layer including the n-th neuron elements (n≧2) functions as the generating apparatus of the nonlinear oscillation in the self-sustained oscillation state. As the unstability of the dynamical system (differential equation system) becomes increased, a solution trajectory in the state space extended by the output potentials $x_i$ of the linear artificial neurons of the first layer 100 repeats bifurations such as Hopf bifurcation. The solution orbit can easily be estimated from the standpoint of the physical property of the nonlinear oscillator that it is often and finally transited into the strange attractor, i.e., chaos via the limit cycle (periodic orbit) and/or torus (in the two-dimensional phase space, quasiperiodic orbit).

The above-described embodiments indicate the generations of the limit cycle (refer to FIGS. 6 through 8) and of the chaos (refer to FIGS. 14A through 14C and FIG. 15), particularly, by giving the specific numerical values to the internal parameters of $URAN_n$.

Hence, $URAN_n$ according to the present invention can effectively be applied to the variety of systems as the variety of nonlinear oscillation generating apparatus.

In this case, the output temporal signals from $URAN_n$ may be defined by the output potential $x_i$ of the linear artificial neuron $x_i$ of the first layer 100 or may be defined by the internal potential $u_j$ of the nonlinear artificial neuron $y_j$ of the second layer 200, or may be defined by the output potential $y_j$ thereof.

The nonlinear oscillator achieved by $URAN_n$ having each layer including the n-th elements (n≧2) can exhibit functions of, so-called, "neural cocktail party effect" and/or "hyper chaos generation" due to mutual attractions between the nonlinear oscillations such as the limit cycle (periodic trajectory), torus (quasiperiodic orbit), and chaos in a mutually synthesized oscillation state of a plurality of oscillators. This can easily be estimated from physical characteristics of the nonlinear oscillators.

Hereinafter, application examples of $URAN_n$ will be described below.

Figure 9:
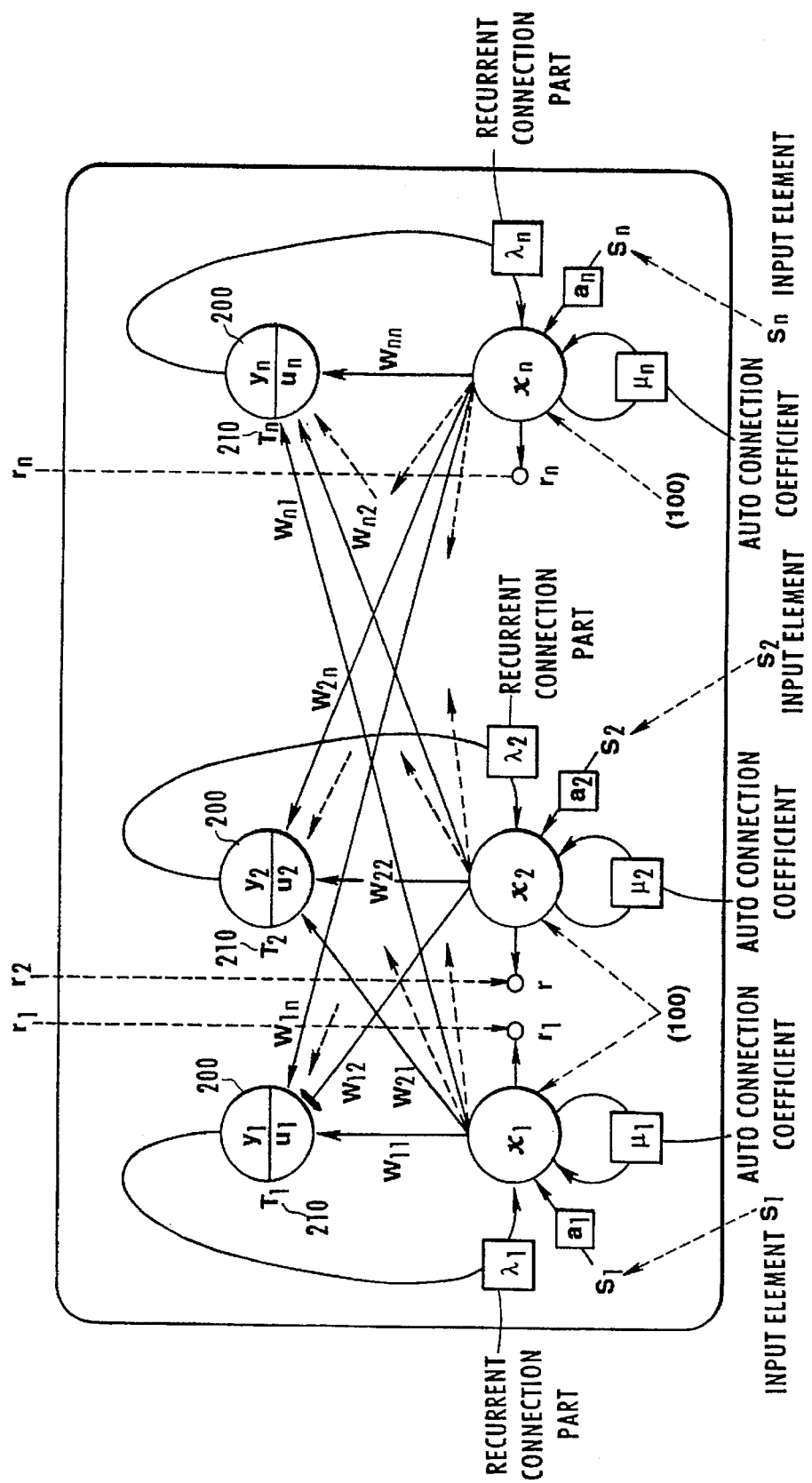
FIG. 9 is a model view of an embodiment of one of application examples of the $URAN_n$ in which a temporal signal is input to and output from a nonlinear oscillator using $URAN_n$ so as to achieve a nonlinear filter.

First, FIG. 9 shows one embodiment of the application examples of $URAN_n$ which carries out the temporal signal processing.

It is noted that a specific circuit structure of $URAN_n$ shown in FIG. 9 is already shown in FIG. 5 (n=2).

In the structure of the $URAN_n$ shown in FIG. 9, each temporal input signal $S_i(t)$ (i=1, 2, - - -, n) is input to the corresponding one of the artificial neurons $x_i$ of the first layer 100 and each output $x_i(t)$ of the artificial neuron of the first layer 100 serves as each temporal output signal $r_i(t)$ of $URAN_n$, in addition to the basic structure shown in FIG. 3.

The circuit structure of FIG. 9 can be used as the nonlinear filter for the purpose of the temporal signal processing.

It is noted that each temporal signal denoted by $S_i(t)$ received by $URAN_n$ may, alternatively, be input to the corresponding one of the nonlinear artificial neurons $y_j$ of the second layer 200. It is also noted that the internal potential $u_j$ of, alternatively, the output potential $y_j(t)$ of the nonlinear artificial neuron $y_j$ of the second layer 200 may, alternatively, be used as the temporal signal $r_i(t)$ output from $URAN_n$.

In addition, in a case where the structure of FIG. 9 is used as the nonlinear filter to convert the temporal signals, a suitable input element $S_i$ (for example, $x_i$ or $y_i$) is selected and the temporal signal $S_i(t)$ is input to the selected input element $S_i$. Here, the signal conversion is carried out on the basis of previously set input/output characteristics of $URAN_n$ and, thereafter, the output temporal signal $r_i(t)$ can be derived from the selected output element $r_i$ (for example, $x_i$ or $y_i$). Here, which of the output signals is used may properly be selected depending upon desired input/output relationships.

Figure 10:
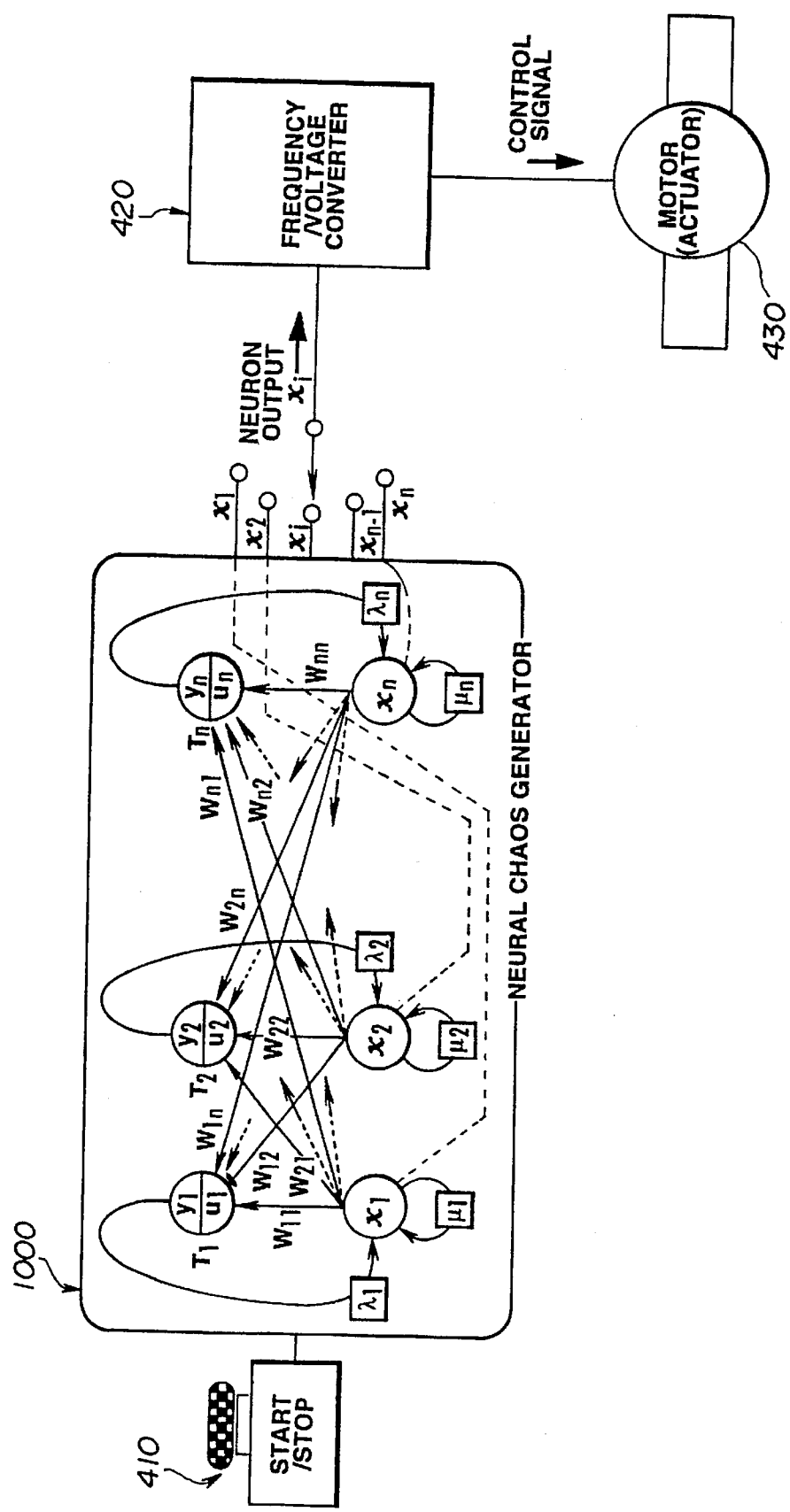
FIG. 10 is a circuit block diagram of an 1/f fluctuations generating apparatus to which a chaotic temporal signal generating function of the nonlinear oscillator using $URAN_n$ according to the present invention is applicable as another embodiment of the application examples of the $URAN_n$.

FIG. 10 shows a schematic circuit block diagram of an embodiment of the application examples of the structure of $URAN_n$ shown in FIG. 9 to a practical system.

A temporal signal generator 1000 to which the structure of $URAN_n$ according to the present invention is utilized is provided and operates as a fluctuation generator of such as, so-called, 1/f (f: frequency) fluctuations (also called, in an electric resistor, flicker noises, or pink noises).

As shown in FIG. 10, any one of several temporal output signals output from the temporal signal generator 1000 is selected by means of, for example, a multiplexer from among several temporal output signals $x_1$ through $x_n$ and the selected temporal signal is retrieved and converted into a corresponding voltage by means of a frequency/voltage converter 420. The corresponding voltage signal derived from the frequency/voltage converter 420 serves to actuate a driving unit 430 such as a motor or another actuator. Consequently, the fluctuations (for example, 1/f fluctuations) involved in the chaotic temporal signal generated from $URAN_n$ (1000) can be used to provide waveform fluctuations and/or pitch fluctuations near to natural sounds for a sound source or a rhythm source of a composition/ performance system, a speech synthesis system, or voice (vocal, or utterance) conversion (or translation) system.

In the same way, the temporal signal derived from $URAN_n$ having the fluctuations can be applied to control operations for a vehicle, building interior/exterior equipment such as an air conditioner, lighting system, and a body sonic sheet so as to contribute to an improvement of comfort in residential environments.

In addition, if the temporal signal having the fluctuations are modified and encoded into a spatial pattern, it can contribute to the discussions on the design of the vehicle and the building interior/exterior equipment and to the improvement in the comfort in a light up pattern.

Furthermore, the temporal signal and the spatial pattern having the fluctuations can effectively be utilized to enhance a stage effect on a theatrical performance and/or musical concert in a stage or a live house.

It is noted that reference numeral 410 shown in FIG. 10 denotes a switch selectively set to activate or to stop the temporal signal generator 1000.

Figure 11:
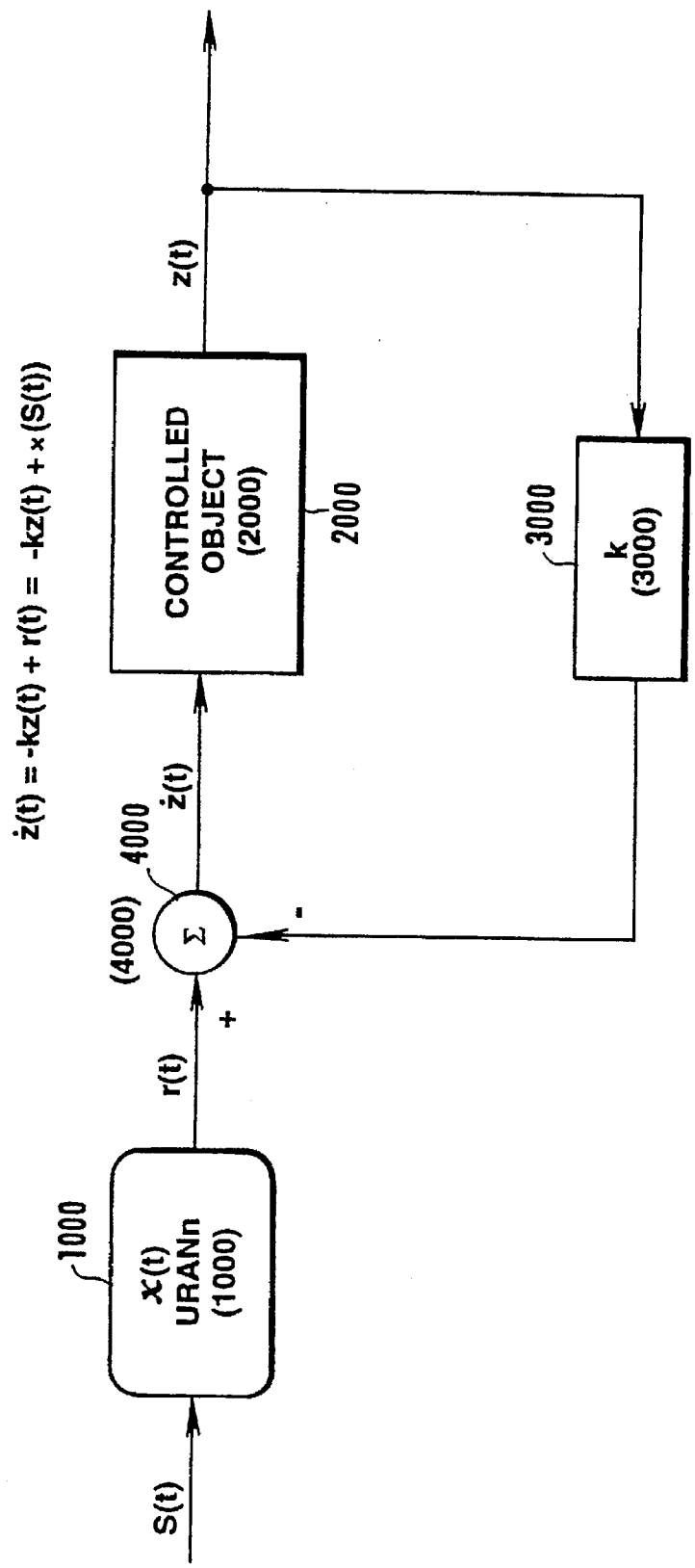
FIG. 11 is a circuit block diagram of a nonlinear feedforward control system to which the temporal processing function of the nonlinear oscillator using $URAN_n$ according to the present invention is applicable as another embodiment of the application examples of $URAN_n$.

Next, FIG. 11 shows another embodiment of the application examples of $URAN_n$ according to the present invention to a feedforward control system.

In FIG. 11, the reference numeral 100 denotes $URAN_n$ shown in FIG. 9, reference numeral 2000 denotes a controlled object of the feedforward control system shown in FIG. 11, a reference numeral 3000 denotes a feedback circuit (k denotes a feedback gain), and reference numeral 4000 denotes an adder.

According to the structure shown in FIG. 11, a result of the signal conversion of the input control signal S(t) on the basis of the input/output characteristics of the prepared $URAN_n$ 1000 is provided for the controlled object 2000 as r(t) so that it becomes possible to compensate for a nonlinear behavior that the controlled object 2000 inherently has. The input signal z(t) of the controlled object 2000 can be expressed as z(t)=-kz(t)+r(t)=-kz(t)+x(S(t)).

Figure 12:
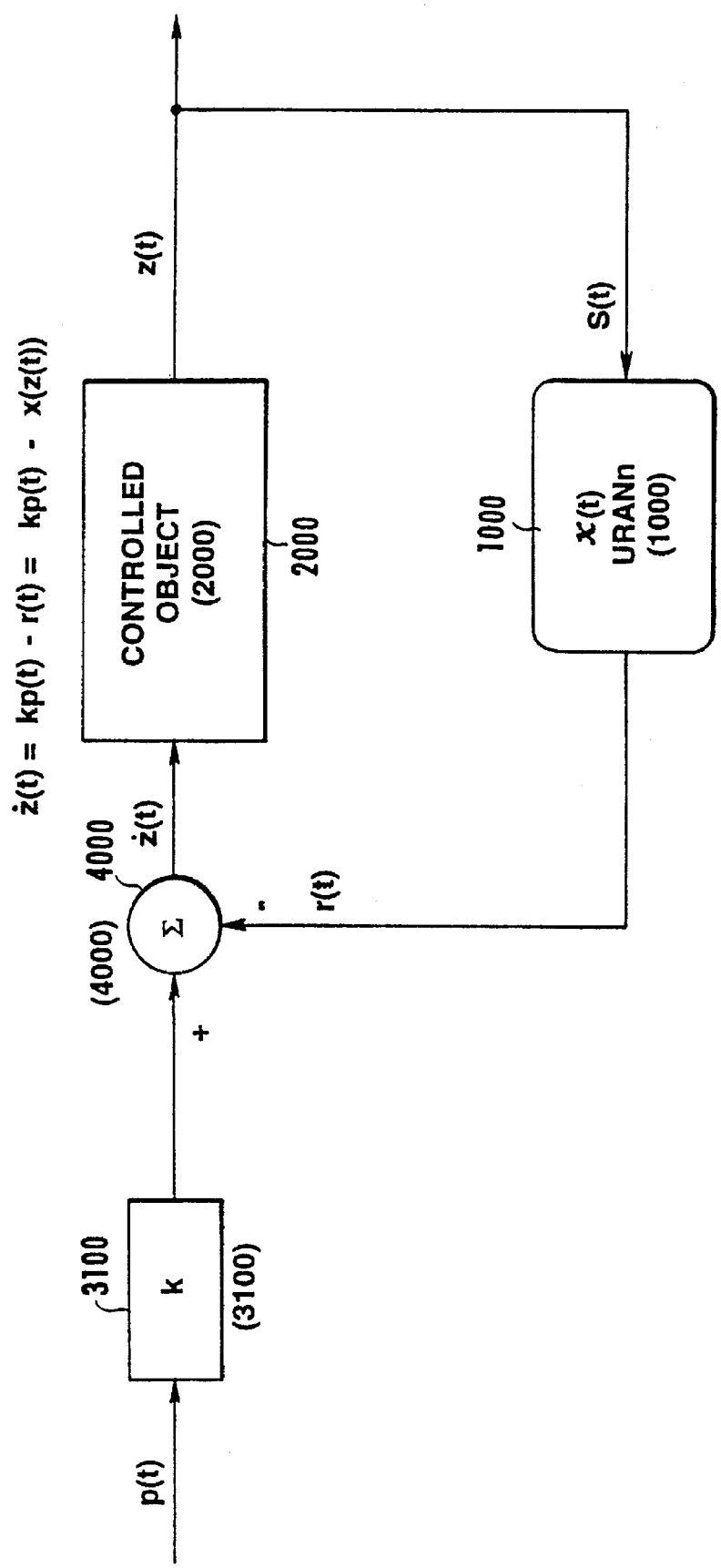
FIG. 12 is a circuit block diagram of a nonlinear feedback control system to which a temporal processing function of the nonlinear oscillator using the $URAN_n$ according to the present invention is applicable as another embodiment of the application examples of $URAN_n$.

Next, FIG. 12 shows another embodiment of the application examples of $URAN_n$ shown in FIG. 9 according to the present invention to a feedback control system.

In FIG. 12, the reference numeral 1000 denotes $URAN_n$ shown in FIG. 9, the reference numeral 2000 denotes the controlled object 2000, a reference numeral 3100 denotes an input gain (input amplifier) having the gain k, and the reference numeral 4000 denotes an adder (summer).

The structure shown in FIG. 12 is a system to compensate for the nonlinear behaviour of the controlled object 2000 in the feedback control mode.

Figure 13:
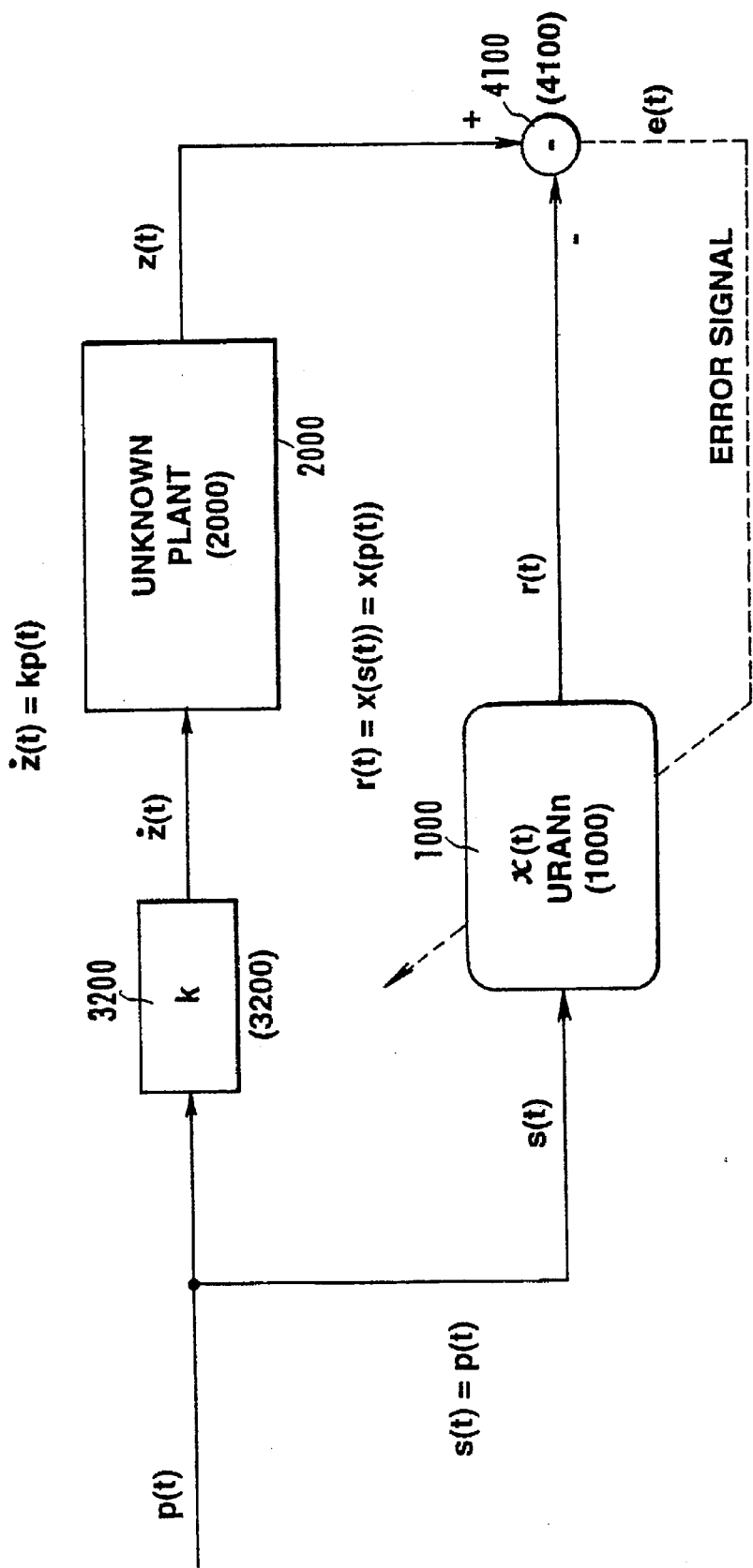
FIG. 13 is a circuit block diagram of a nonlinear characteristic identification apparatus to which the temporal processing function of the nonlinear oscillator using $URAN_n$ according to the present invention is applicable to a still another embodiment of $URAN_n$.

As described in FIG. 12, a subtraction result of the feedback output r(t) of $URAN_n$ 1000 from the input signal p(t) multiplied by k by means of the input gain 3100 is input to the controlled object 2000.

next, FIG. 13 shows another embodiment of the application examples of $URAN_n$ according to the present invention to a nonlinear characteristic identification apparatus for an unknown plant 2000.

The structure shown in FIG. 13 represents the apparatus for identifying a nonlinear characteristics of the plant 2000 whose characteristics (transfer function) is unknown.

In operation, the input signal p(t) is passed through $URAN_n$ 1000 as its input of s(t) to provide the value of r(t). Here, the output z(t) of the unknown plant 2000 is added to the adder (4100). In addition, The adder 4100 receives the value of r(t) from $URAN_n$ together with z(t) so that the internal parameters of $URAN_n$ 1000 are modified to give an output error signal e(t) of both signals z(t) and r(t) zero. In this way, the internal parameters of $URAN_n$ in the case where the output error signal e(t) gives zero correspond to internal parameters (,i.e., the nonlinear characteristics) of the unknown plant 2000.

According to the identification apparatus shown in FIG. 13, the internal parameters of the identified unknown plant 2000, which is the nonlinear dynamical system, such as a viscous resistance having a nonlinear temperature characteristics in, for example, a multi-axis robot (or manipulator), a Coriolis force in proportion to a velocity, mass and inertia moment which determine an acceleration performance of the multi-axis robot can be identified.

In addition, if the various embodiments of the application examples are combined systematically, a system having high-level functions can be achieved.

For example, when an utterance (vocal sound) is identified and learned by the nonlinear characteristic identifying apparatus shown in FIG. 13 and the 1/f fluctuation generating apparatus shown in FIG. 10 gives the waveform fluctuations and pitch fluctuations to reproduced utterance (reproduced vocal sound), the speech synthesis system generating the vocal sound (utterance) having natural fluctuations can be achieved.

As described hereinabove, the structure of $URAN_n$ according to the present invention is summarized as follows:

1) The two-layer hierarchical structure recurrent neural network ($URAN_n$) is provided, each layer having the same number (n) of the neuron elements.

2) The first layer 100 (element group) ($x_i$) is constituted by the linear artificial neurons $x_1$ which add and/or subtract the respective input signals and output signals after the linear amplifications (input sum $x_i$, output $x_i$). In addition, the second layer (element group) $y_j$ of the second layer 200 is constituted by the nonlinear artificial neurons $y_j$ which add and subtract their respective input signals and output them after the nonlinear calculations (input sum $u_j$ and output $y_j$) of $y_j=f(u_j)$. The nonlinear artificial neurons $y_j$ have the nonlinear output functions f, respectively.

3) It is desirable for the nonlinear output function f to convert the input sum $u_j$ of the nonlinear artificial neurons $y_j$ of the element group of the second layer 200 to the outputs to have the high symmetry. For example, although $y_j=f(u_j)=\tanh(u_j)$ has been adopted, the generally known output function of $f(u_j)=1/[1+\exp(-u_j)]$ (sigmoid function) may, alternatively, be used in place of the former. In the latter case, a suitable change of variables permits the mathematical equivalent discussion to the nonlinear function of $\tanh(u_j)$.

4) The feedforward connection part 300 multiplies the signal $x_i$ by $w_{ji}$ and transmits the multiplied signal to each one of the artificial neurons $y_j$ of the second layer 200. In details, the outputs of the artificial neurons $x_i$ of the first layer 100 are multiplied by $w_{ji}$ and, thereafter, are input to each one of all artificial neurons $y_j$ of the second layer 200.

5) The recurrent connection part 310 includes the excitatory or inhibitory connections and is provided with the first-order time delay. In details, the signals from the nonlinear artificial neurons $y_j$ of the second layer 200 are multiplied by $\lambda_j$, the time delay $\tau_j$ are provided for the $\lambda_j$ multiplied signals of the second layer artificial neurons $y_j$ and, finally, fedback again into the artificial neurons $x_j$ of the first layer 100.

6) The auto connection part 320 includes the excitatory or inhibitory connections and is provided with the first order time delay. In details, the signals from the artificial neurons $x_i$ of the first layer 100 are multiplied by $\mu_i$, the time delays $\tau_i$ are provided so as to be fedback again into the respectively corresponding artificial neurons $x_i$ of the first layer 100.

Next, the following advantages can be achieved by $URAN_n$ summarized above according to the present invention.

(1B) Since $URAN_n$ has a great margin in settings of the internal parameters, the degree of freedom in design in the internal parameters is so large that $URAN_n$ can generate the nonlinear oscillations having universal (freely variable) waveforms and frequencies.

(2B) Since the nonlinear function having the high symmetry, for example, $f(x)\equiv\tanh(x)$ has been adopted as the output function of the nonlinear artificial neuron $y_j$ of the second layer 200 within the $URAN_n$, the analysis of the dynamics in the recurrent neural network ($URAN_n$) and the derivations of the formulae can be executed with the good prospect. If $f(x)=1/[1+\exp(-x)]$ is selected as the output function, the suitable change of the variables permits the mathematically equivalent discussion in the same way as the case $f(x)=\tanh(x)$.

(3) Since the method of determining the internal parameters of $URAN_n$ is explicitly indicated, the nonlinear oscillations having the desired physical characteristics can easily be generated with few trial number of times before the nonlinear oscillations occur.

Particularly, since $URAN_n$ can be structured and the functions of the feedforward part and feedback part are explicitly separated from each other, the formulae determining the respective connection coefficients can be derived independently of each other.

For example, in the case of (n=2) where $URAN_n$ is $URAN_2$, the connection coefficients of the feedforward part 300 can be given by the equation (4) and the connection coefficients of the connection parts 320 and 310 are given by equations (5) and (6), respectively.

On the other hand, in the case of (n=3) where $URAN_n$ is $URAN_3$, the connection coefficients of the feedforward part 300 can be given by the equation (8) and the connection coefficients of the feedback parts 320 and 310 can be given by the equations (9) and (10), respectively.

Hence, for example, (4B-1) In $URAN_2$ (2-variable Unlimited Recurrent Adjustable Network), by considering the relationships between the physical property of the nonlinear oscillation to be generated and the geometrical shape of the solution trajectory of the differential equation (1) mainly in the state space of $x_1-x_2$ (this state space is a two-dimensional phase space extended by the output potential $x_i$ of the corresponding linear artificial neuron $x_1$ of the first layer 100 shown in FIG. 3) and the equilibrium state $g_i(x_1, x_2, \ldots, x_n)=0$, the formulae groups of (3) through (6) (27), and (28) to determine the group of the internal parameters of $URAN_2$ are derived so that the desired nonlinear oscillations can be generated. It is noted that the self-sustained oscillation is the limit cycle according to a Poincare'.Bendixon's theorem.

For example, if the group of the internal parameters given as the equation (24) are used, the limit cycle temporal signal (refer to FIG. 6) in the space of $x_i=t$ and a trajectory of the limit cycle (refer to FIGS. 7 and 8) in the state space of $x_1-x_2$ can be observed.

(4B-2) In the case where $URAN_n=URAN_3$ (3-variable Unlimited Recurrent Adjustable Network), the desired nonlinear oscillation (the self-sustained oscillations are such as the limit cycle, torus, and chaos) can be generated by determining the group of the internal parameters from the formulae (7) through (12), and (29) derived in the same way as the case where n=2.

For example, in the case where the group of the internal parameters such as those given by the equations (34) are used, the chaotic temporal signal (refer to FIG. 14) can be observed in the space of $x_i=t$ and the strange attractor (refer to FIG. 15) can be observed in the state space of $x_1-x_2-x_3$, respectively.

The following advantages and application examples are considered in the respective embodiments described above.

(1C) In $URAN_n$ constituted by the respective layers having the n-th number of elements, in the case where the real part of the complex eigen value in the Jacobian matrix (19) of the differential equation in the vicinity of the equilibrium point is negative, this $URAN_n$ carries out the damped oscillation.

(2C) In $URAN_n$ constituted by the respective layers having the n-th number of elements, in the case where the real part of the complex eigen value in the Jacobian matrix (19) of the differential equation in the vicinity of the equilibrium point is positive, this $URAN_n$ carries out the self-sustained oscillation.

(3) In the $URAN_2$ having each layer including the two elements, the $URAN_2$ functions as the nonlinear self-sustained oscillation generating apparatus due to unstability in the equilibrium point caused by the Hopf bifurcation during the relaxation oscillation. The generated oscillation indicates the limit cycle (periodic) trajectory) in the two-dimensional state space. Here, from the above-described item (2C), the real part of the complex eigen value of the Jacobian matrix in the vicinity of the equilibrium point is positive.

(4C) Since the shape of the generated periodic trajectory in the two-dimensional state space under the condition described in the item (3C) corresponds to the stability of the nonlinear ordinary differential equation representing $URAN_2$ expressed by the geometrical shape of the equilibrium state and the parameters of the geometrical shape of the limit cycle and internal parameters of the temperature coefficients and first-order time delays are supposed, the method for calculating the system parameters such as the connection coefficients between the artificial neurons of the $URAN_2$ are derived (refer to FIG. 7).

(5C) In $URAN_n$ having each layer constituted by the equal n-th number of elements, $RAN_n$ approximately functions as the conversion apparatus of the nonlinear temporal signal.

In this case, as the amplitude of the forced oscillation which excites $URAN_n$ from its external is increased, the solution repeats the bifurcation such as the Hopf bifurcation so that its oscillation is transited finally into the chaos via the limit cycle (periodic trajectory) and torus (quasiperiodic trajectory). This can easily be estimated from the physical characteristics of the nonlinear oscillator.

(8C) In $URAN_n$ having each layer including the n-th number of elements ($n\geq 3$), the $URAN_n$ can exhibit the performance of "neural cocktail party effect" and/or "hyper chaos generation" due to the mutual entertainment between the nonlinear oscillations such as the limit cycle (periodic trajectory) and torus (quasiperiodic trajectory) in the mutually synthesized state of the plurality of oscillators. This can easily be estimated from the physical characteristics of the nonlinear oscillators.

(7C) In $URAN_n$ having each layer including the n-th number of elements, the method for inputting and outputting the temporal signals to $URAN_n$ to apply the temporal signal processing function (for example, the application thereof to the nonlinear filter) is shown in FIG. 9.

(8C) In URAN$_n$ having each layer including the n-th number of elements, the URAN$_n$ to be applied as the chaotic temporal signal generating system (for example, the application thereof to the 1/f fluctuation generation system) is shown in FIG. 10.

(9C) In URAN$_n$ having each layer including the n-th number of elements, the temporal signal processing function of URAN$_n$ which is applied to the feedforward control system is shown in FIG. 11.

(10C) In URAN$_n$ having each layer including the n-th number of elements, the temporal signal processing function of URAN$_n$ to the nonlinear feedback control system is shown in FIG. 12.

(11C) In URAN$_n$ having each layer including the n-th number of elements, the temporal signal processing function of URAN$_n$ which is applied to the nonlinear characteristic identification apparatus is shown in FIG. 13.

The invention should be understood to include all possible embodiments and modification to the shown embodiments which can be embodied without departing from the principle of the invention as set forth in the appended claims.

What is claimed is:

1. A nonlinear oscillation apparatus having a recurrent neural network having a two-layer hierarchical structure and a recurrent connection, each layer of said recurrent neural network including the same number of neuron elements, and said recurrent neural network comprising:

a) a first layer including a plurality of circuits of linear artificial neurons X$_i$ (i=1, 2, - - -, i, - - - n);

b) a second layer including a plurality of circuits of nonlinear artificial neurons y$_j$ (j=1, 2, - - -, j, - - -, n) and arranged to convert input signals thereto into output signals by means of given same nonlinear functions f, their temperature parameters being denoted by T$_j$;

c) a feedforward connection part arranged to multiply outputs of the first layer circuits of linear artificial neurons x$_i$ by feedforward connection coefficients w$_{ji}$ and to output each of the multiplied outputs to a corresponding one of all of the circuits of nonlinear artificial neurons y$_j$ of said second layer;

d) a recurrent connecting part arranged to multiply outputs of the respective circuits of nonlinear artificial neurons y$_j$ of said second layer by recurrent connection coefficients $\gamma_j$, to output first-order delays of time constants $\tau_j$ for the multiplied outputs of the respective circuits of nonlinear artificial neurons y$_j$, and to input the delayed multiplied output of each respective circuit of onlinear artificial neurons y$_j$ to a corresponding one of the circuits of linear artificial neurons x$_j$ of said first layer; and e) an auto connection part arranged to multiply the outputs of the respective circuits of linear artificial neurons x$_i$ of the first layer, to output the first-order delays of the time constants $\tau_i$ for the multiplied outputs from said auto connection part, and to input again each of the first-order delayed outputs to the corresponding one of said circuits of linear artificial neurons x$_i$, and wherein said recurrent neural network operates in accordance with the following equation (1) and said nonlinear oscillation apparatus generates a nonlinear oscillation when said recurrent neural network operates in accordance with the following equation (1), $$\tau_1 \frac{dx_1}{dt} = -x_1 + \mu_1 x_1 + \lambda_1 f\left(\frac{w_{11}x_1 + w_{12}x_2 + \ldots + w_{1n}x_n}{T_1}\right) \quad (1)$$

$$\equiv g_1(x_1, x_2, \ldots x_n)$$

$$\vdots$$

$$\tau_i \frac{dx_i}{dt} = -x_i + \mu_i x_i + \lambda_i f\left(\frac{w_{i1}x_1 + w_{i2}x_2 + \ldots + w_{in}x_n}{T_i}\right)$$

$$\equiv g_i(x_1, x_2, \ldots x_n)$$

$$\vdots$$

$$\tau_n \frac{dx_n}{dt} = -x_n + \mu_n x_n + \lambda_n f\left(\frac{w_{n1}x_1 + w_{n2}x_2 + \ldots + w_{nn}x_n}{T_n}\right)$$

$$\equiv g_n(x_1, x_2, \ldots x_n),$$

wherein f denotes the given nonlinear function having saturation characteristics, and g denotes a characteristic function to discuss a stability of a differential equation and a nullcline when g=0.

2. A nonlinear oscillation apparatus having a recurrent neural network having a two-layer hierarchical structure and a recurrent connection, each layer of said recurrent neural network including the same number of elements as claimed in claim 1, wherein the nonlinear output function f having the saturation characteristics is expressed as f(x)=tanh(x).

3. A nonlinear oscillation apparatus having a recurrent neural network having a two-layer hierarchical structure and a recurrent connection, each layer of said recurrent neural network including the same number of elements as claimed in claim 1, wherein a normal vector A$_i$ is defined from either equation (3) or equation (7), said normal vector representing a direction of a tangent space of the nullcline at a coordinate origin of a state space in a spatial figure in a letter Z shape derived from the equation (1) as g$_i$ (x$_1$, x$_2$, . . . , x$_n$)=0, wherein a distance C$_i$ from the coordinate origin to an asymptote of said nullcline g$_i$ (x$_1$, x$_2$, . . . , x$_n$)=0 is defined, and wherein said feedforward connection coefficients w$_{ji}$, said recurrent connection coefficients $\lambda_i$, said auto connection coefficients $\mu_i$ of the circuits of linear artificial neurons x$_i$, and said temperature parameters T$_j$ of the circuits of nonlinear artificial neurons y$_j$ of the second layer are determined according to a formulae group shown by either of equations (4) through (6) or equations (8) through (10), these equations (5) through (6) and (9) through (10) being derived from a limitation condition established between a virtual time constant $\epsilon_i$ corresponding to the time constant in a scaled equation shown in an equation (2) derived from the equation (1) and the time constant $\tau_i$ of the first-order time delay, thus said nonlinear oscillation apparatus having said recurrent neural network generating the nonlinear oscillation having a desired physical property, said equation (2), (3), (4), (5), (6), (7), (8), (9) and (10) being expressed as follows:

$$\epsilon_1 \frac{dx_1}{dt} = -x_1 + C_1 f\left(\frac{w_{11}x_1 + w_{12}x_2 + \ldots + w_{1n}x_n}{T_1}\right) \quad (2)$$

$$\epsilon_i \frac{dx_i}{dt} = -x_i + C_i f\left(\frac{w_{i1}x_1 + w_{i2}x_2 + \ldots + w_{in}x_n}{T_i}\right)$$

$$\epsilon_n \frac{dx_n}{dt} = -x_n + C_n f\left(\frac{w_{n1}x_1 + w_{n2}x_2 + \ldots + w_{nn}x_n}{T_n}\right),$$

$$A_1 = (a_{11}, a_{12}) \quad (3)$$
$$A_2 = (a_{21}, a_{22}),$$

-continued $$w_{11} = \frac{a_{11}}{a_{12}} w_{12} + \frac{T_1}{C_1}, w_{12} = -1, \quad (4)$$

$$w_{21} = 1, w_{22} = \frac{a_{22}}{a_{21}} w_{21} + \frac{T_2}{C_2},$$

$$\mu_1 = 1 - \frac{\tau_1}{\epsilon_1} \quad \mu_2 = 1 - \frac{\tau_2}{\epsilon_2}, \quad (5)$$

$$\lambda_1 = C_1 \frac{\tau_1}{\epsilon_1} \quad (6)$$

$$\lambda_2 = C_2 \frac{\tau_2}{\epsilon_2},$$

$$A_1 = (a_{11}, a_{12}, a_{13}) \quad (7)$$
$$A_2 = (a_{21}, a_{22}, a_{23})$$
$$A_3 = (a_{31}, a_{32}, a_{33}),$$

$$w_{11} = \frac{a_{11}}{a_{12}} w_{12} + \frac{T_1}{C_1}, w_{12} = -1, w_{13} = \frac{a_{13}}{a_{12}} w_{12}, \quad (8)$$

$$w_{21} = 1, w_{22} = \frac{a_{22}}{a_{21}} w_{21} + \frac{T_2}{C_2}, w_{23} = \frac{a_{23}}{a_{21}} w_{21},$$

$$w_{31} = -1, w_{32} = \frac{a_{32}}{a_{31}} w_{31}, w_{33} = \frac{a_{22}}{a_{31}} w_{31} + \frac{T_3}{C_3},$$

$$\mu_1 = 1 - \frac{\tau_1}{\epsilon_1} \quad \mu_2 = 1 - \frac{\tau_2}{\epsilon_2} \quad \mu_3 = 1 - \frac{\tau_3}{\epsilon_3}, \text{ and} \quad (9)$$

$$\lambda_1 = C_1 \frac{\tau_1}{\epsilon_1} \quad (10)$$

$$\lambda_2 = C_2 \frac{\tau_2}{\epsilon_2}$$

$$\lambda_3 = C_3 \frac{\tau_3}{\epsilon_3}.$$

4. A nonlinear oscillation apparatus having a recurrent neural network having a two-layer hierarchical structure and a recurrent connection, each layer of said recurrent neural network including the same number of elements as claimed in claim 3, wherein an n-th order nonlinear ordinary differential equation represents a dynamical system of said recurrent neural network, a stability of the equation (1) is determined according to a complex eigen value or a Jacobian matrix representing a linear approximation in the vicinity to a fixed point so as to derive an oscillation condition, the derived oscillation condition being corresponded to the geometrical shape of said nullcline so that said nonlinear oscillation apparatus having the recurrent neural network generates a desired nonlinear oscillation.

5. A nonlinear oscillation apparatus having a recurrent neural network having a two-layer hierarchical structure and a recurrent connection, each layer of said recurrent neural network including the same number of elements as claimed in claim 4, wherein said nonlinear oscillation is under a self-sustained oscillation condition and is provided with non-chaotic solution having either a periodic solution or quasiperiodic solution, a target time constant τ to achieve a target oscillation number ω of the desired nonlinear oscillation is adjusted by the recurrent neural network on the basis of the following equation (13):

$$\tau = \frac{2\pi}{\omega} \times \frac{m}{t_m - t_o} \times \tau^o,$$

wherein $t_m - t_o$ denotes a time difference between a time $t_o$ at which the oscillation waveform in a graph in a $x_i$-t space after crosses a time axis t after the nonlinear self-sustained oscillation starts and a sufficient time has passed to fall in an equilibrium and a time $t_m$ at which the oscillation waveform again crosses the time axis t after the m period, and wherein $\tau^o$ denotes an arbitrary time constant to a trial nonlinear self-sustained oscillation for the recurrent neural network by means of a numerical simulation.

6. A nonlinear oscillation apparatus having a recurrent neural network having a two-layer hierarchical structure and a recurrent connection, each layer of said recurrent neural network including the same number of elements as claimed in claim 4, wherein said nonlinear oscillation apparatus having recurrent neural network generates a nonlinear oscillation waveform corresponding to a geometrical shape of the nullclines and to a solution trajectory of the n-th order nonlinear ordinary differential equation within the n-dimensional state space extended by output of the corresponding circuits of the circuits of linear artificial neurons $x_i$ of the first layer and having a frequency corresponding to said virtual time constant $\epsilon_i$ so that said nonlinear oscillation circuit having said recurrent neural network generates the nonlinear oscillation from a limit cycle to a chaos.

7. A nonlinear oscillation apparatus having a recurrent neural network having a two-layer hierarchical structure and a recurrent connection, each layer of said recurrent neural network including the same number of elements as claimed in claim 6, wherein input signals are inputted to either the circuits of the linear artificial neurons $x_i$ of the first layer or the circuits of the nonlinear artificial neurons $y_j$ of the second layer, the outputs of either the circuits of the linear artificial neurons $x_i$ of the first layer or the circuits of the nonlinear artificial neurons $y_j$ of the second layer serving as output signals so that a nonlinear filtering of the input signals is carried out in said nonlinear oscillation apparatus having the recurrent neural network.

8. A nonlinear oscillation apparatus having a recurrent neural network having a two-layer hierarchical structure and a recurrent connection, each layer of said recurrent neural network including the same number of elements as claimed in claim 1, wherein the recurrent neural network system having each layer including n circuits of the artificial neuron elements is operated as a chaotic temporal signal generating apparatus as of said nonlinear oscillation apparatus, its output signal of the chaotic time series generating apparatus being provided with a 1/f (wherein f is frequency) fluctuation characteristic.

9. A nonlinear oscillation apparatus having a recurrent neural network having a two-layer hierarchical structure and a recurrent connection, each layer of said recurrent neural network including the same number of elements as claimed in claim 8, wherein a control input signal s(t) is inputted to either each of the circuits of the linear artificial neurons $x_i$ of the first layer or each of the circuits of the nonlinear artificial neurons $y_j$ of the second layer, the outputs of either the circuits of the linear artificial neurons $x_i$ of the first layer or the circuits of the nonlinear artificial neurons $y_j$ of the second layer serving as a control output signal r(t), said control output signal being outputted for a controlled object, the nonlinear oscillation apparatus thus including the recurrent neural network compensating the nonlinear characteristics that said controlled object inherently has.

10. A nonlinear oscillation apparatus having a recurrent neural network having a two-layer hierarchical structure and a recurrent connection, each layer of said recurrent neural network including the same number of elements as claimed in claim 1, wherein a controlled results S(t) of the controlled object is inputted to either each of the circuits of the linear artificial neurons $x_i$ of the first layer or each of the circuits of the nonlinear artificial neurons of the second layer, the respective outputs of the circuits of the linear artificial neurons $x_i$ of the first layer or of the circuits of the nonlinear artificial neurons $y_j$ of the second layer are fedback to the controlled object so that the recurrent neural network of said nonlinear oscillation apparatus carries out the nonlinear feedback control compensating the nonlinear characteristics that the controlled object inherently has.

11. A nonlinear oscillation apparatus having a recurrent neural network having a two-layer hierarchical structure and a recurrent connection, each layer of said recurrent neural network including the same number of elements as claimed in claim 1, wherein the same input signals p(t) are inputted to a plant having an unknown nonlinear characteristics and to said recurrent neural network so that internal parameters of the recurrent neural network are modified to eliminate an output error between the plant having the unknown nonlinear characteristics and the recurrent neural network, thus identifying the unknown nonlinear characteristics of the plant.

12. An apparatus based on an n-variable unlimited recurrent adjustable network, comprising:

a) at least two hierarchically structured layers, each layer having the same number (n) of neuron circuit elements;

b) a plurality of linear artificial neuron circuit elements $x_i$ (i1, 2, - - - , i, - - - , n) constituting a first layer of the two layers;

c) a plurality of nonlinear artificial neuron circuit elements $y_j$ (j=1, 2, - - - , j, - - - , n) having respective temperature-dependent parameters $T_j$ constituting a second layer of the two layers, each nonlinear artificial neuron circuit element $y_j$ converting an input signal thereto into an output signal using a predetermined nonlinear function f;

d) a feedforward connection part arranged to multiply each output signal derived from each one of the linear artificial neuron circuit elements ($x_i$) of the first layer by a feedforward connection coefficient $w_{ji}$ and to output each of the multiplied output signals ($w_{11}, w_{12}, - - - w_{1j}$, - - - , $w_{1n}, w_{21}, w_{22}, - - - , w_{2j}, - - - , w_{2n}, - - - , w_{n1}$, $w_{n2}, - - - , w_{nj}, - - - , w_{nn}$) for all of the nonlinear artificial neuron circuit elements $y_j$ of the second layer;

e) a recurrent connection part arranged to multiply each output signal derived from the nonlinear artificial neuron circuit elements $y_j$ of the second layer by a recurrent connection coefficient $\lambda_j$, to output a first-order time delay corresponding to a time constant $\tau_j$ for the $\lambda_j$ multiplied output signal, and, thereafter, to provide the $\tau_j$ delayed and $\lambda_j$ multiplied output signal again to the corresponding one $x_j$ of the linear artificial neuron circuit elements of the first layer; and f) an auto connection part arranged to multiply the output signal derived from each one $x_i$ of the respective linear artificial neuron circuit elements of the first layer by an auto connection coefficient $\mu_i$, to output the first-order delay corresponding to the time constant $\tau_i$ for the $\mu_i$ multiplied signal, and to output the $\mu_i$ multiplied, $\mu_i$ delayed signal again for the corresponding one $x_i$ of the respective linear artificial neuron circuit elements.

13. An apparatus based on an n-variable unlimited recurrent adjustable network as claimed in claim 12, wherein the apparatus is operated according to either of the following equations to generate a nonlinear oscillation, said apparatus, thus, being a nonlinear oscillation apparatus:

in a continuous time system, $$\tau_1 \frac{dx_1}{dt} = -x_1 + \mu_1 x_1 + \lambda_1 f\left( \frac{w_{11}x_1 + w_{12}x_2 + \ldots + w_{1n}x_n}{T_1} \right) \quad (1)$$

$$\equiv g_1(x_1, x_2, \ldots x_n)$$

$$\vdots$$

$$\tau_i \frac{dx_i}{dt} = -x_i + \mu_i x_i + \lambda_i f\left( \frac{w_{i1}x_1 + w_{i2}x_2 + \ldots + w_{in}x_n}{T_i} \right)$$

$$\equiv g_i(x_1, x_2, \ldots x_n)$$

$$\vdots$$

$$\tau_n \frac{dx_n}{dt} = -x_n + \mu_n x_n + \lambda_n f\left( \frac{w_{n1}x_1 + w_{n2}x_2 + \ldots + w_{nn}x_n}{T_n} \right)$$

$$\equiv g_n(x_1, x_2, \ldots x_n),$$

wherein f denotes the predetermined nonlinear function having satuaration characteristics and g denotes a characteristic function to discuss a stability of each corresponding differential equation and, when g=0, a nullcline is defined, and in a discrete time system, $$\tau_1 x_1(t+1) = \mu_1 x_1(t) + \lambda_1 f\left( \frac{w_{11}x_1(t) + w_{12}x_2(t) + \ldots + w_{1n}x_n(t)}{T_1} \right) \quad (38)$$

$$\vdots$$

$$\tau_i x_i(t+1) = \mu_i x_i(t) + \lambda_i f\left( \frac{w_{i1}x_1(t) + w_{i2}x_2(t) + \ldots + w_{in}x_n(t)}{T_i} \right)$$

$$\vdots$$

$$\tau_n x_n(t+1) = \mu_n x_n(t) + \lambda_n f\left( \frac{w_{n1}x_1(t) + w_{n2}x_2(t) + \ldots + w_{nn}x_n(t)}{T_n} \right).$$

14. An apparatus based on an n-variable unlimited recurrent adjustable network as claimed in claim 13, wherein said predetermined nonlinear function f is expressed as f(x)=tanh (x).

15. An apparatus based on an n-variable unlimited recurrent adjustable network as claimed in claim 13, wherien said predetermined nonlinar function f is expressed as f(x)=1/ [1+exp(−x)].

16. An apparatus based on an n-variable unlimited recurrent adjustable network as claimed in claim 14, wherein said apparatus further comprises: g) defining means for defining a normal vector $A_i$ ($a_{i1}, a_{i2}, \ldots, a_{in}$) representing a direction of a tangent space of a nullcline at a coordinate origin of a state space in a spatial figure of a letter Z shape derived when $g_i(x_1, x_2, - - -, x_n)=0$ in the equation (1) and for defining a distance $C_i$ from the coordinate origin up to an asymptote of the nullcline $g_i(x_1, x_2, - - -, x_n)$, said defining means defining the normal vector by either an equation (3) or an equation (7); and h) determining means for determining the respective internal parameters of the feedforward connection coefficient, recurrent connection coefficient, and auto connection coefficient according to formulae groups of either equations (4) through (6) or equations (8) through (10) derived under a limitation condition established between a virtual time constant $\epsilon_i$ corresponding to the time constant in a scaled equation shown in the following equation (2) derived from the equation (1) and the first-order time delay constant $\tau_i$ in the equation (1) so that the apparatus generates the nonlinear oscillation having a desired physical property, $$\epsilon_1 \frac{dx_1}{dt} = -x_1 + C_1 f\left(\frac{w_{11}x_1 + w_{12}x_2 + \ldots + w_{1n}x_n}{T_1}\right) \quad (2)$$

$$\epsilon_i \frac{dx_i}{dt} = -x_i + C_i f\left(\frac{w_{i1}x_1 + w_{i2}x_2 + \ldots + w_{in}x_n}{T_i}\right)$$

$$\epsilon_n \frac{dx_n}{dt} = -x_n + C_n f\left(\frac{w_{n1}x_1 + w_{n2}x_2 + \ldots + w_{nn}x_n}{T_n}\right),$$

in the equation (1), $n = 2$ and
$A_1 = (a_{11}, a_{12})$ (3)
$A_2 = (a_{21}, a_{22})$, $$w_{11} = \frac{a_{11}}{a_{12}} w_{12} + \frac{T_1}{C_1}, w_{12} = -1, \quad (4)$$

$$w_{21} = 1, w_{22} = \frac{a_{22}}{a_{21}} w_{21} + \frac{T_2}{C_2},$$

$$\mu_1 = 1 - \frac{\tau_1}{\epsilon_1} \quad \mu_2 = 1 - \frac{\tau_2}{\epsilon_2}, \quad (5)$$

$$\lambda_1 = C_1 \frac{\tau_1}{\epsilon_1} \quad (6)$$

$$\lambda_2 = C_2 \frac{\tau_2}{\epsilon_2},$$

in the equation (1), $n = 3$ and
$A_1 = (a_{11}, a_{12}, a_{13})$ (7)
$A_2 = (a_{21}, a_{22}, a_{23})$
$A_3 = (a_{31}, a_{32}, a_{33})$, $$w_{11} = \frac{a_{11}}{a_{12}} w_{12} + \frac{T_1}{C_1}, w_{12} = -1, w_{13} = \frac{a_{13}}{a_{12}} w_{12}, \quad (8)$$

$$w_{21} = 1, w_{22} = \frac{a_{22}}{a_{21}} w_{21} + \frac{T_2}{C_2}, w_{23} = \frac{a_{23}}{a_{21}} w_{21},$$

$$w_{31} = -1, w_{32} = \frac{a_{32}}{a_{31}} w_{31}, w_{33} = \frac{a_{22}}{a_{31}} w_{31} + \frac{T_3}{C_3},$$

$$\mu_1 = 1 - \frac{\tau_1}{\epsilon_1} \quad \mu_2 = 1 - \frac{\tau_2}{\epsilon_2} \quad \mu_3 = 1 - \frac{\tau_3}{\epsilon_3}, \text{ and} \quad (9)$$

$$\lambda_1 = C_1 \frac{\tau_1}{\epsilon_1} \quad (10)$$

$$\lambda_2 = C_2 \frac{\tau_2}{\epsilon_2}$$

$$\lambda_3 = C_3 \frac{\tau_3}{\epsilon_3}.$$

17. An apparatus based on an n-variable unlimited recurrent adjustable network as claimed in claim 16, which further comprises: i) deriving means for determining a stability of the equation (1) according to an eigen value of a Jacobian matrix representing a linear approximation in the vicinity of a fixed point to derive an oscillation condition of the apparatus; and j) corresponding means for corresponding the derived oscillation condition to a geometrical shape of the nullcline $g_i(x_1, x_2, \text{---}, x_n)=0$, so that the apparatus to generate the nonlinear oscillation generates a target nonlinear oscillation.

18. An apparatus based on an n-variable unlimited recurrent adjustable network as claimed in claim 17, wherein the stability of the equation (1) means an n-th order nonlinear ordinary differential equation representing a dynamical system of the recurrent neural network $URAN_n$.

19. An apparatus based on an n-variable unlimited recurrent adjustable network as claimed in claim 18, wherein said apparatus comprises the nonlinear oscillation apparatus, said nonlinear oscillation apparatus being under a self-sustained oscillation condition and having a non-chaotic solution of a periodic solution and/or a quasi-periodic solution and said apparatus further comprises: k) adjusting means for adjusting a target time constant $\tau$ to achieve a target frequency $\omega$ of the nonlinear oscillation to be generated on the basis of the following equation (13):

$$\tau = \frac{2\pi}{\omega} \times \frac{m}{t_m - t_0} \times \tau^o, \quad (13)$$

wherein $\tau^o$ denotes an arbitrary time constant for the apparatus to generate a trial nonlinear self-sustained oscillation through a numerical simulation, $t_m - t_0$ denotes a time difference between a certain time $t_0$ at which an oscillation waveform in a graph in a state space of $x_i$-t crosses a time axis t after a sufficient time has passed when the nonlinear self-sustained oscillation has reached to a steady state upon a start of the nonlinear self-sustained oscillation and a time $t_m$ at which the oscillation waveform crosses again the time axis t after m periods, and $\tau_i$ of the equation (1) or corresponds to the virtual time constant $\epsilon_i$ of the scaled equation (2).

20. An apparatus based on an n-variable unlimited recurrent adjustable network as claimed in claim 19, wherein said apparatus generates the nonlinear oscillation from a limit cycle to chaos having the waveform corresponding to a solution trajectory of the n-th order nonlinear ordinary differential equation within an n-variable state space extended by the output of the linear artificial neuron circuit elements $x_i$ of the first layer and having a frequency corresponding to the virtual time constant $\epsilon_i$.

21. An apparatus based on an n-variable unlimited recurrent adjustable network as claimed in claim 20, wherein an input signal $S_i(t)$ of the apparatus is received by either each of the linear artificial neuron circuit elements $x_i$ of the first layer or each of the nonlinear artificial neuron circuit elements $y_i$ of the second layer and an output signal $r_i(t)$ of the apparatus is derived from either each of the linear artificial neuron circuit elements $x_i$ of the first layer or each of the nonlinear artificial neuron circuit elements $y_i$, said apparatus carrying out a nonlinear filtering for the input signal thereof.

22. An apparatus based on an n-variable unlimited recurrent adjustable network as claimed in claim 20, wherein said apparatus functions as a chaotic temporal signal generating apparatus, an output signal of said chaotic temporal signal generating apparatus being a time series signal having a 1/f (where f is frequency) fluctuation characteristic.

23. An apparatus based on an n-variable unlimited recurrent adjustable network as claimed in claim 20, which further comprises a controlled object and wherein a control input signal S(t) of the apparatus is received by either each of the linear artificial neuron circuit elements $x_i$ of the first layer or each of the nonlinear artificial circuit neuron elements $y_j$ of the second layer and a control output signal r(t) of the apparatus is derived from either each of the linear artificial neuron circuit elements $x_i$ of the first layer or each of the nonlinear artificial neuron circuit elements $y_j$ of the second layer, said apparatus outputting the control output signal r(t) for the controlled object so that said apparatus carries out a nonlinear feedforward control to compensate for nonlinear characteristics provided in said controlled object.

24. An apparatus based on an n-variable unlimited recurrent adjustable network as claimed in claim 20, which further comprises a controlled object and wherein a controlled result z(t) of the controlled object is received by either each of the linear artificial neuron circuit elements $x_i$ of the first layer or each of the nonlinear artificial neuron circuit elements $y_j$ of the second layer and an output signal r(t) of the apparatus which is derived from either each of the linear artificial neuron circuit elements $x_i$ of the first layer or each of the nonlinear artificial neuron circuit elements $y_j$ of the second layer is fedback to the controlled object, said apparatus carrying out a nonlinear feedback control to compensate for nonlinear characteristics provided in said controlled object.

25. An apparatus based on an n-variable unlimited recurrent adjustable network as claimed in claim 20, which further comprises a plant having unknown nonlinear characteristics and wherein the same input signal $s(t)=p(t)$ is supplied both to the plant and to said apparatus so that the internal parameters of said apparatus are modified to eliminate an error $e(t)$ between output signals from said plant and apparatus, said apparatus functioning to identify the plant having the unknown nonlinear characteristics.

26. An apparatus based on an n-variable unlimited recurrent adjustable network, wherein n is an arbitrary number, and said apparatus comprising:

a) at least two hierarchically structured layers, each layer having the same number (n) of neuron circuit elements;

b) a plurality of linear artificial neuron circuit elements $X_i$ (i=1 - - - n) constituting a first layer of the two layers and comprising first adders (100);

c) a plurality of nonlinear artificial neuron circuit elements $y_j$ (j=1 - - - n), having respective temperature-dependent parameters Tj, constituting a second layer of the two layers, comprising second adders and nonlinear amplifiers (200), each nonlinear artificial neuron circuit element $y_j$ converting an input signal thereto into an output signal using a predetermined nonlinear function f to tanh(x);

d) a feedforward connection part, connection between said linear artificial neuron circuit element and said nonlinear artificial neuron circuit element and comprising a plurality of multipliers, to multiply each output signal derived from each one of the linear artificial neuron circuit elements ($x_i$) of the first layer by a feedforward connection coefficient $w_{ji}$ and to output each of the multiplied output signals ($w_{ji} x_i$) for all of the nonlinear artificial neuron circuit elements ($y_j$) of the second layer;

e) a recurrent connection part, connected between output ends of the nonlinear artificial neuron circuit element and input ends of the linear artificial neuron circuit element and comprising delay circuit elements (312) and associated multipliers (311), to multiply each output signal derived from the nonlinear artificial neuron circuit elements $y_j$ of the second layer by a recurrent connection coefficient $\lambda_j$, to output a first-order time delay corresponding to a time constant $\tau_j$ for the $\lambda_j$ multiplied output signal, and, thereafter, to output the $\tau_j$ delayed and the $\lambda_j$ multiplied output signal again to the corresponding one ($x_j$) of the linear artificial neuron circuit elements of the first layer; and f) an auto connection part, connected between the linear artificial neuron circuit element and the same linear artificial neuron circuit element and comprising delay circuit elements (322) and multipliers (321), to multiply the output signal derived from each one $x_i$ of the respective linear artificial neuron circuit elements of the first layer by an auto connection coefficient $\mu_i$, to output the first-order delay corresponding to the time constant $\tau_i$ for the $\mu_i$ multiplied signal, and to output the $\mu$ multiplied, $\tau_i$ delayed signal again for the corresponding one $x_i$ of the respective linear artificial neuron circuit elements.

\* \* \* \* \*